United States Patent
Chen et al.

(10) Patent No.: US 9,591,662 B2
(45) Date of Patent: Mar. 7, 2017

(54) ACK/NACK TRANSMISSION FOR MULTI-CARRIER OPERATION

(71) Applicant: QUALCOMM Incorporated, San Diego, CA (US)

(72) Inventors: Wanshi Chen, San Diego, CA (US); Xiaoxia Zhang, San Diego, CA (US); Peter Gaal, San Diego, CA (US); Juan Montojo, Nuremberg (DE); Xiliang Luo, San Diego, CA (US); Tao Luo, San Diego, CA (US); Jelena Damnjanovic, Del Mar, CA (US); Aleksandar Damnjanovic, Del Mar, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 14/792,283

(22) Filed: Jul. 6, 2015

(65) Prior Publication Data

US 2015/0312934 A1    Oct. 29, 2015

Related U.S. Application Data

(62) Division of application No. 13/209,388, filed on Aug. 13, 2011, now Pat. No. 9,112,692.

(Continued)

(51) Int. Cl.
*H04W 72/04* (2009.01)
*H04W 72/12* (2009.01)
(Continued)

(52) U.S. Cl.
CPC ...... *H04W 72/1284* (2013.01); *H04B 7/0632* (2013.01); *H04L 1/1861* (2013.01);
(Continued)

(58) Field of Classification Search
None
See application file for complete search history.

(56) References Cited

U.S. PATENT DOCUMENTS 8,102,802 B2    1/2012  Ratasuk et al.
8,451,790 B2    5/2013  Dai et al.
(Continued)

FOREIGN PATENT DOCUMENTS

CN    101594209 A    12/2009
CN    101795492 A    8/2010
(Continued)

OTHER PUBLICATIONS

Catt: "DAI Design for LTE-A", 3GPP Draft; R1-102644, 3rd Generation Partnership Project (3GPP), Mobile Competence Centre ; 650, Route Des Lucioles ; F-06921 Sophia-Antipolis Cedex ; France, vol. RAN WG1, No. Montreal, Canada; May, 10, 2010, May 4, 2010 (May 4, 2010), XP050419856, [retrieved on May 4, 2010].

(Continued)

*Primary Examiner* — Chi H Pham
*Assistant Examiner* — Shick Hom
(74) *Attorney, Agent, or Firm* — Norton Rose Fulbright US LLP

(57) ABSTRACT

Techniques for acknowledging data transmissions in a multi-carrier wireless communication network are disclosed. In some aspects, a user equipment (UE) receives a data transmission on at least one component carrier (CC) in a plurality of configured CCs. The UE determines acknowledgement/negative acknowledgement (ACK/NACK) information for the data transmission and determines an uplink channel for sending the ACK/NACK information. When the ACK/NACK information is sent on a PUCCH, the UE may perform power control based on which CCs in the plurality of configured CCs data is received. When the ACK/NACK information is sent on a PUSCH, the UE may determine a number of resource elements based on its CC configuration.

28 Claims, 12 Drawing Sheets

Related U.S. Application Data

(60) Provisional application No. 61/374,210, filed on Aug. 16, 2010.

(51) Int. Cl.
*H04L 1/18* (2006.01)
*H04W 52/32* (2009.01)
*H04W 52/42* (2009.01)
*H04B 7/06* (2006.01)
*H04L 5/00* (2006.01)
*H04W 52/34* (2009.01)

(52) U.S. Cl.
CPC ......... *H04L 5/0055* (2013.01); *H04W 52/325* (2013.01); *H04W 52/42* (2013.01); *H04W 52/34* (2013.01)

(56) References Cited

U.S. PATENT DOCUMENTS

| | | | |
|---|---|---|---|
| 8,494,572 | B2 | 7/2013 | Chen et al. |
| 9,112,692 | B2* | 8/2015 | Chen ................ H04L 1/1861 |
| 2009/0073904 | A1 | 3/2009 | Ranta-aho et al. |
| 2009/0168750 | A1 | 7/2009 | Pelletier et al. |
| 2010/0098012 | A1 | 4/2010 | Bala et al. |
| 2010/0208679 | A1* | 8/2010 | Papasakellariou .... H04L 1/1614 370/329 |
| 2010/0271970 | A1 | 10/2010 | Pan et al. |
| 2011/0002278 | A1* | 1/2011 | Lindoff ................ H04L 1/0017 370/329 |
| 2011/0044261 | A1 | 2/2011 | Cai et al. |
| 2012/0039279 | A1 | 2/2012 | Chen et al. |
| 2012/0039280 | A1 | 2/2012 | Chen et al. |
| 2012/0039291 | A1 | 2/2012 | Kwon et al. |
| 2012/0063400 | A1* | 3/2012 | Papasakellariou .... H04L 1/1607 370/329 |
| 2012/0106569 | A1 | 5/2012 | Che et al. |
| 2012/0134334 | A1 | 5/2012 | Ko et al. |
| 2012/0263052 | A1 | 10/2012 | Dai et al. |

FOREIGN PATENT DOCUMENTS

| | | |
|---|---|---|
| JP | 2012512582 A | 5/2012 |
| JP | 2012514910 A | 6/2012 |
| JP | 2012516616 A | 7/2012 |
| WO | WO-2010015429 A1 | 2/2010 |
| WO | WO-2010069422 A1 | 6/2010 |
| WO | WO-2010087674 A2 | 8/2010 |
| WO | WO-2010091165 A2 | 8/2010 |

OTHER PUBLICATIONS

CATT: "Performance evaluation o f UL ACK/NACK multiplexing methods in LTE-A", 3GPP Draft; R1-103468, 3rd Generation Partnership Project (3GPP), Mobile Competence Centre ; 650, Route Des Lucioles ; F-06921 Sophia-Antipolis Cedex ; France, vol. RAN WG1, No. Dresden, Germany; Jun. 28, 2010, Jun. 23, 2010 (Jun. 23, 2010), XP050449394, Section 2; p. 1.

CATT: "UL ACK/NACK Transmission Design in FDD with CA", 3GPP Draft; R1-100876, 3rd Generation Partnership Project (3GPP), Mobile Competence Centre ; 650, Route Des Lucioles ; F-06921 Sophia-Antipolis Cedex ; France, vol. RAN WGl, No. San Francisco, USA; Feb. 22, 2010, Feb. 16, 2010 (Feb. 16, 2010), XP050418480, [retrieved on Feb. 16, 2010].

Dahlman E., et al., "3G Evolution : HSPA and LTE for Mobile Broadband", Dec. 31, 2008 (Dec. 31, 2008), Academic Press, Burlington, MA, U.S.A., XP002661113, ISBN: 978-0-12-374538-5.

Ericsson, "On ACK/NACK codebook performance for carrier aggregation," 3GPP TSG-RAN WG1 #61bis, R1-103508, Dresden, Germany, Jun. 28-Jul. 2, 2010.

International Search Report and Written Opinion—PCT/US2011/047757—ISA/EPO—Mar. 7, 2012.

LG Electronics: "UCI on PUSCH for carrier aggregation", 3GPP Draft; R1-103732 LTEA_UCI Piggyback, 3RD Generation Partnership Project (3GPP), Mobile Competence Centre; 650, Route Des Lucioles; F-06921 Sophia-Antipolis Cedex; France, vol.Ran WG1, No. Dresden, Germany; 20100628, Jun. 22, 2010 Jun. 22, 2010),XP050449163.

Motorola: " Uplink ACK/NACK Transmission Format for Carrier Aggregation", R1-103157, 3GPP TSG RAN1#61, Montreal, Canada, May 10-14, 2010, 6.2.4.1, pp. 3.

Motorola: "Uplink ACK/NACK Transmission Format for Carrier Aggregation", 3GPP Draft; R1-103934, 3RD Generation Partnership Project (3GPP) , Mobile Competence Centre ; 650, Route Des Lucioles ; F-06921 Sophia-Anti Polis Cedex ; France, vol. RAN WG1, No. Dresden, Germany; 20100628, XP050449311, Jun. 28, 2010 (Jun. 28, 2010), 3 pages.

Panasonic: "UL ACK/NACK transmission on PUCCH for carrier aggregation", 3GPP TSG-RAN WG1 Meeting #58bis, 3GPP, Oct. 16, 2009, R1-093942, pp. 4.

Partial International Search Report—PCT/US2011/047757—ISA/EPO—Dec. 7, 2011 (102537U1WO).

QUALCOMM Incorporated: "LTE-A UL power control", 3GPP Draft ; R4-102401, 3RD Generation Partnership Project (3GPP), Mobile Competence Centre ; 650, Route Des Lucioles ; F-06921 Sophia-Antipolis Cedex ; France, vol. RAN WG4, No. Bratislava; 20100628, Jun. 23, 2010 (Jun. 23, 2010), XP050454665, p. 1-p. 2.

QUALCOMM Incorporated: "UL Power Control for Multicarrier Operation" 3GPP Draft; R1-100677 UL Power Control for MC, 3RD Generation Partnership Project (3GPP), Mobile Competence Centre; 650, Route Des Lucioles; F-06921 Sophia-Antipolis Cedex; France, vol . RAN WG1, No. Valencia, Spain; 20100118, Jan. 12, 2010 (Jan. 12, 2010), pp. 1-5, XP050418270 [retrieved on Jan. 12, 2010] the whole document.

ZTE: "Methods for ACK/NACK multiplexing", 3GPP Draft; R1-102907 Evaluation of an Multiplexing for Carrier Aggregation, 3RD Generation Partnership Project (3GPP), Mobile Competence Centre ; 650, Route Des Lucioles ; F-06921 Sophia-Antipolis Cedex ; France, vol . RAN WG1, No. Montreal, Canada; 20100510, XP050420043, May 4, 2010 (May 4, 2010), 8 pages.

* cited by examiner

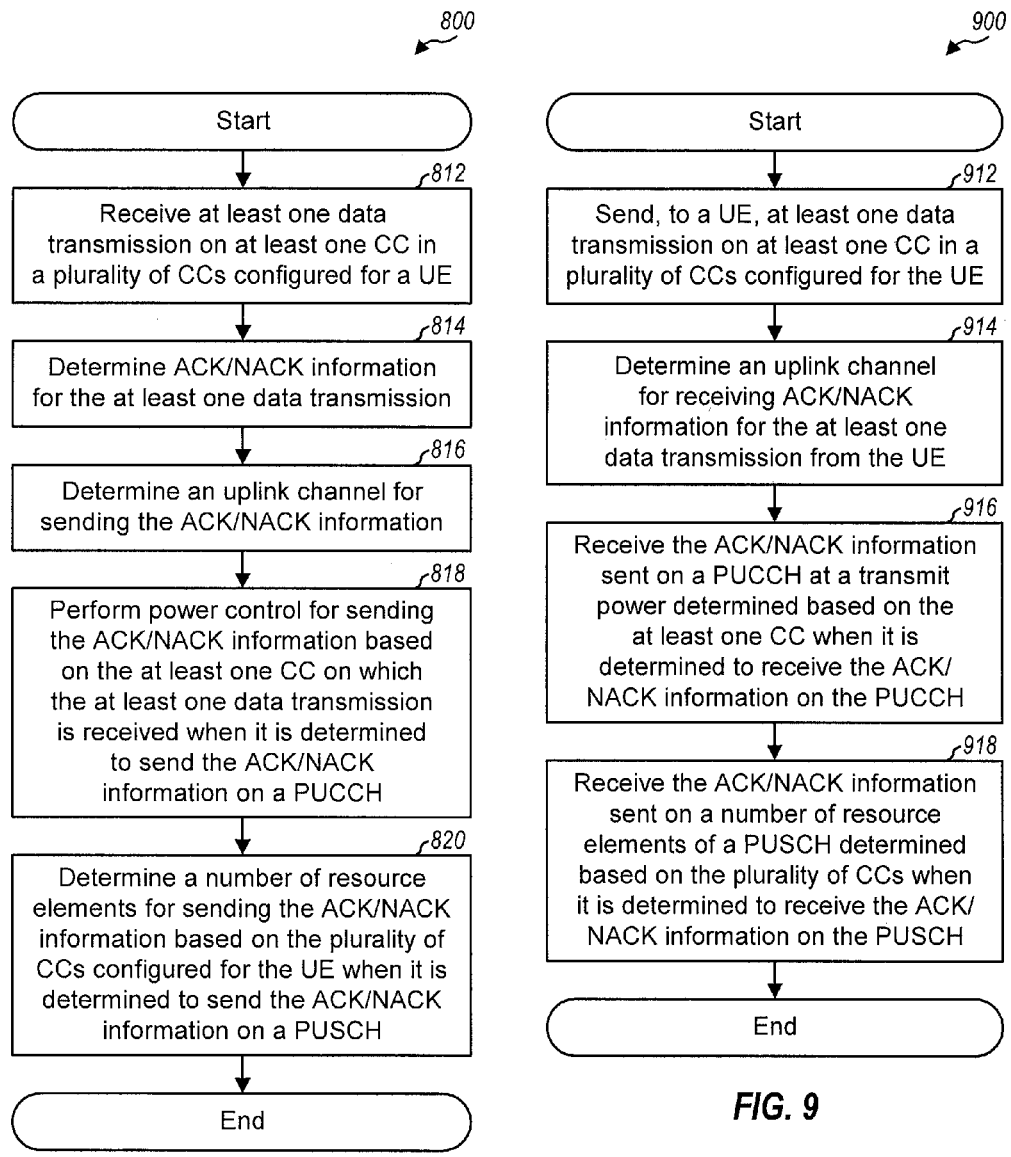

ACK/NACK TRANSMISSION FOR MULTI-CARRIER OPERATION

The present application is a divisional of, commonly assigned, U.S. Pat. No. 9,112,692 entitled "ACK/NACK TRANSMISSION FOR MULTI-CARRIER OPERATION," filed on Aug. 13, 2011, which itself claims priority to provisional U.S. Application No. 61/374,210, entitled "METHODS AND APPARATUS FOR ACK/NACK RELATED DESIGN FOR CARRIER AGGREGATION IN LTE-A NETWORKS," filed Aug. 16, 2010, and incorporated herein by reference in its entirety.

BACKGROUND

I. Field

The present disclosure relates generally to communication and, more specifically, to techniques for supporting communication in a multi-carrier wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

Some wireless communication networks support operation on multiple component carriers (CCs). A CC may refer to a range of frequencies used for communication and may be associated with certain characteristics. For example, a CC may be associated with system information describing operation on the CC. A CC may also be referred to as a carrier, a cell, a serving cell, a frequency channel, etc.

SUMMARY

Techniques for sending acknowledgement/negative acknowledgement (ACK/NACK) information in a multi-carrier wireless communication network are disclosed. A user equipment (UE) may be configured for operation on a plurality of component carriers (CCs). The UE may receive one or more downlink grants on one or more physical downlink control channels (PDCCHs) on one or more of its configured CCs. The UE may also receive a data transmission on one or more physical downlink shared channels (PDSCHs) on one or more of its downlink CCs and may determine ACK/NACK information for the received data transmission. The UE may select an uplink channel for the sending the ACK/NACK information and may determine a manner of sending the ACK/NACK information on the selected uplink channel as described in the present disclosure.

In one aspect, the UE receives a data transmission on a plurality of configured CCs and determines ACK/NACK information for the data transmission. The UE determines an uplink channel for sending the ACK/NACK information which may be a physical uplink control channel (PUCCH) or a physical uplink shared channel (PUSCH). When the PUCCH is utilized, the UE may perform power control for sending the ACK/NACK information on the PUCCH based on the CCs on which the data transmission is received (i.e., CCs on which the PDSCH is detected). Alternatively, when the PUSCH is utilized, the UE may determine a number of resource elements for sending the ACK/NACK information on the PUSCH based on its configured CCs. The multi-carrier UE may thus utilize a different set of CCs (detected CCs or configured CCs) for sending ACK/NACK information on its uplink channels.

In one aspect, the UE receives a data transmission on a plurality of CCs and determines ACK/NACK information for acknowledging the data transmission on the PUCCH. This may include determining a total number of transport blocks which are received in the data transmission over the plurality of CCs. The total number of transports blocks may be determined based on a transmission mode and/or DCI format of each CC on which data transmission is detected. The UE may determine a transmit power for sending the ACK/NACK information based on the total number of transport blocks, and may send the ACK/NACK information to a base station on the PUCCH in accordance with the determined transmit power.

In another aspect, the UE may receive a data transmission on at least one CC in a plurality of configured CCs and may determine ACK/NACK information for acknowledging the data transmission on the PUSCH. The UE may determine a number of resource elements for sending the ACK/NACK information based on the plurality of configured CCs. This may include determining a number of ACK/NACK bits for the configured CCs irrespective of the number of CCs on which the data transmission is detected in a downlink subframe. In one particular example, the UE may sum the number of ACK/NACK bits associated with a transmission mode of each configured CC to determine total ACK/NACK bits upon which the number of resource elements is based. The UE may send the ACK/NACK information on the PUSCH based on the determined number of resource elements.

Various additional aspects of the disclosure are described in further detail below.

BRIEF DESCRIPTION OF THE DRAWINGS

FIG. 8 shows a process for sending ACK/NACK information.

FIG. 9 shows a process for receiving ACK/NACK information.

DETAILED DESCRIPTION

The techniques described herein may be used for various wireless communication networks such as CDMA, TDMA, FDMA, OFDMA, SC-FDMA and other wireless networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi and Wi-Fi Direct), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
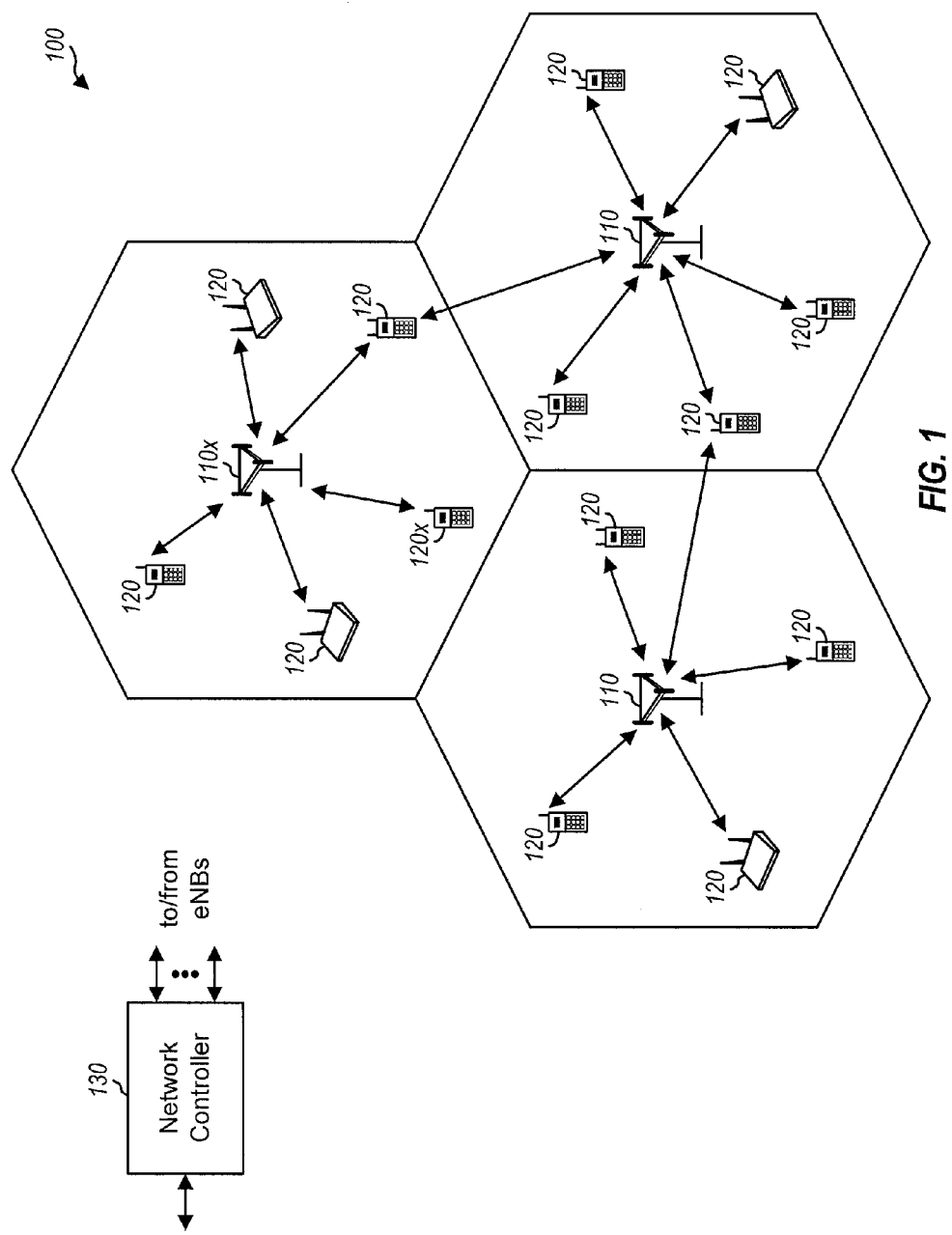
FIG. 1 shows a wireless communication network.

FIG. 1 shows a wireless communication network 100, which may be an LTE network or some other wireless network. Wireless network 100 may include a number of evolved Node Bs (eNBs) 110 and other network entities. An eNB may be an entity that communicates with the UEs and may also be referred to as a Node B, a base station, an access point, etc. Each eNB may provide communication coverage for a particular geographic area and may support communication for the UEs located within the coverage area. To improve network capacity, the overall coverage area of an eNB may be partitioned into multiple (e.g., three) smaller areas. Each smaller area may be served by a respective eNB subsystem. In 3GPP, the term "cell" can refer to a coverage area of an eNB and/or an eNB subsystem serving this coverage area. In general, an eNB may support one or multiple (e.g., three) cells. The term "cell" may also refer to a carrier on which an eNB operates.

A network controller 130 may couple to a set of eNBs and provide coordination and control for these eNBs. Network controller 130 may communicate with the eNBs via a backhaul. The eNBs may also communicate with one another, e.g., directly or indirectly via wireless or wireline backhaul.

UEs 120 may be dispersed throughout the wireless network, and each UE may be stationary or mobile. A UE may also be referred to as a mobile station, a terminal, an access terminal, a subscriber unit, a station, etc. A UE may be a cellular phone, a smart phone, a tablet, a wireless communication device, a personal digital assistant (PDA), a wireless modem, a handheld device, a laptop computer, a cordless phone, a wireless local loop (WLL) station, a netbook, a smartbook, etc. For clarity, some of the description below refers to UE $120x$ and eNB $110x$, which may be one of the UEs and one of the eNBs in wireless network 100.

LTE utilizes orthogonal frequency division multiplexing (OFDM) on the downlink and single-carrier frequency division multiplexing (SC-FDM) on the uplink. OFDM and SC-FDM partition a frequency spectrum into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, the subcarrier spacing may be 15 kilohertz (KHz), and $N_{FFT}$ may be equal to 128, 256, 512, 1024 or 2048 for system bandwidth of 1.4, 3, 5, 10 or 20 megahertz (MHz), respectively.

Wireless network 100 may utilize FDD or TDD. For FDD, the downlink and uplink may be allocated separate frequency spectrum. Downlink transmissions may be sent on one frequency spectrum, and uplink transmissions may be sent on another frequency spectrum. For TDD, the downlink and uplink may share the same frequency spectrum, and downlink and uplink transmissions may be sent on the same frequency spectrum in different time intervals.

Figure 2:
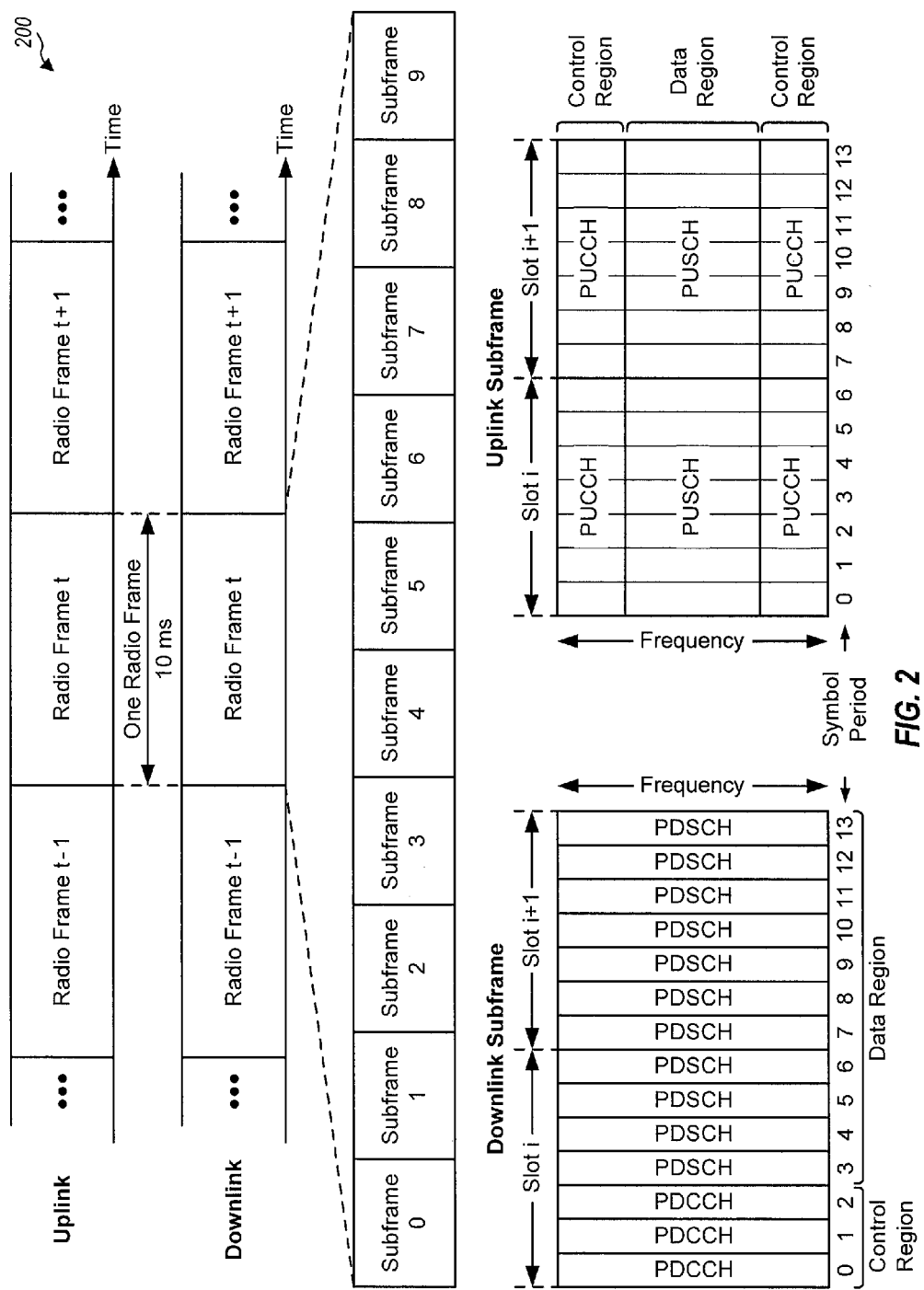
FIG. 2 shows an exemplary frame structure for frequency division duplexing.

FIG. 2 shows an exemplary frame structure 200 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

The available time frequency resources for each of the downlink and uplink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Figure 3:
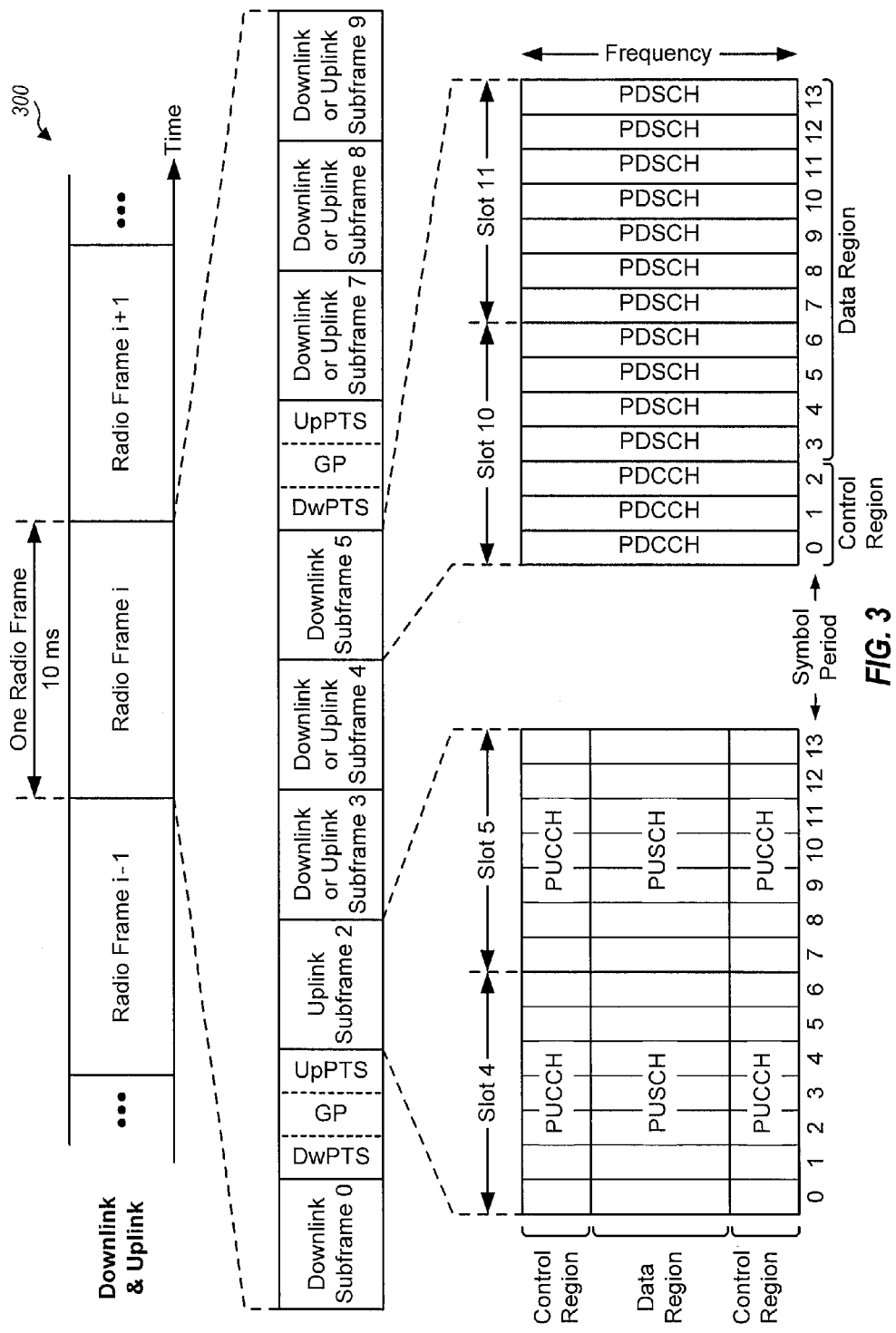
FIG. 3 shows an exemplary frame structure for time division duplexing.

FIG. 3 shows an exemplary frame structure 300 for TDD in LTE. Subframes 0 and 5 are used for the downlink, subframe 2 is used for the uplink, and subframes 3, 4, 7, 8 and 9 may each be used for the downlink or uplink. Subframe 1 includes a Downlink Pilot Time Slot (DwPTS), a Guard Period (GP), and an Uplink Pilot Time Slot (UpPTS). Subframe 6 may include only the DwPTS, or all three special fields, or a downlink subframe. LTE supports a number of uplink-downlink configurations for TDD. Each uplink-downlink configuration indicates whether each subframe is a downlink subframe, an uplink subframe, or a special subframe. There may be as many as nine downlink subframes to one uplink subframe in a radio frame.

As shown in FIGS. 2 and 3, a subframe for the downlink (i.e., a downlink subframe) may include a control region and a data region, which may be time division multiplexed (TDM). The control region may include the first Q symbol periods of the subframe, where Q may be equal to 1, 2, 3 or 4. Q may change from subframe to subframe and may be conveyed in the first symbol period of the subframe. The data region may include the remaining 2L–Q symbol periods of the subframe and may carry data and/or other information for UEs.

An eNB may send downlink control information (DCI) on a physical downlink control channel (PDCCH) in the control region to a UE. The DCI may include a downlink grant, an uplink grant, power control information, etc. The eNB may send data and/or other information on a physical downlink shared channel (PDSCH) in the data region to the UE.

As shown in FIGS. 2 and 3, a subframe for the uplink (i.e., an uplink subframe) may include a control region and a data region, which may be frequency division multiplexed (FDM). The control region may include resource blocks near the two edges of the uplink spectrum (as shown in FIGS. 2 and 3) and may have a configurable size. The data region may include all resource blocks not included in the control region.

A UE may send uplink control information (UCI) to an eNB on a physical uplink control channel (PUCCH) in the control region of an uplink subframe. The UCI may include ACKINACK information for a data transmission received on the downlink, channel state information (CSI), scheduling request (SR), etc. The UE may send data or data and UCI to the eNB on a physical uplink shared channel (PUSCH) in the data region of the uplink subframe. The UE may transmit only the PUCCH or only the PUSCH (and not both) in a subframe in order to maintain a single-carrier waveform, which may have a lower peak-to-average power ratio (PAPR). An uplink transmission may span both slots of a subframe and may hop across frequency.

Wireless network 100 may support operation on multiple CCs on the downlink and one or more CCs on the uplink. Operation on multiple CCs may be referred to as carrier aggregation. A CC for the downlink may be referred to as a downlink CC, and a CC for the uplink may be referred to as an uplink CC. An eNB may transmit data and DCI on one or more downlink CCs to a UE. As used herein, a data transmission may include one or more transport blocks (which may also be referred to as PDSCH transmissions) on one or more CC that are configured for the UE. For example, in a given subframe, the UE may receive multiple PDSCH transmissions on multiple configured CCs. The UE may transmit data and UCI to the eNB on one or more uplink CCs.

Figures 4A, 4B:
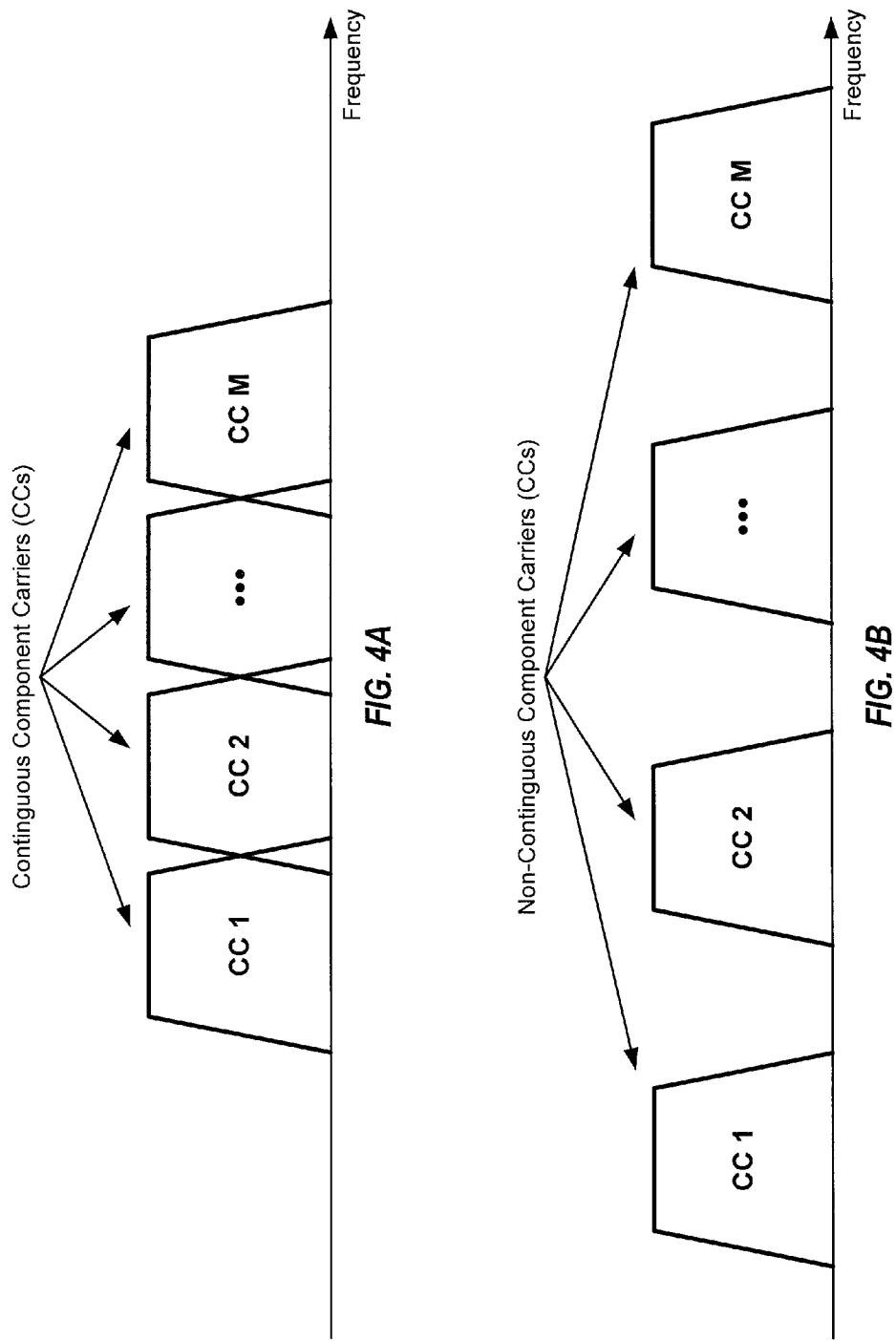
FIGS. 4A and 4B show examples of carrier aggregation.

FIG. 4A shows an example of continuous carrier aggregation. In this example, M CCs are shown as adjacent to each other in frequency, where M may be any integer value. Each CC may have a bandwidth of 20 MHz or less and may be separately configured for a UE.

FIG. 4B shows an example of non-continuous carrier aggregation. In this example, M CCs are shown as separated from each other in frequency. Each non-contiguous CC may have a bandwidth of 20 MHz or less and may be separately configured for a UE.

With carrier aggregation, data and control information may be sent and received on each CC. This may be achieved, for example, by using (i) a separate inverse fast Fourier transform (IFFT) and a separate transmitter for each CC at a transmitting entity and (ii) a separate fast Fourier transform (FFT) and a separate receiver for each CC at a receiving entity. A transmission comprising up to M concurrent OFDM symbols or SC-FDMA symbols may be on up to M CCs in one symbol period. In another example, data and control information may be collectively sent and received on all CCs. This may be achieved by using (i) a single IFFT and a single transmitter for all M CCs at a transmitting entity and (ii) a single FFT and a single receiver for all M CCs at a receiving entity. A single OFDM symbol or SC-FDMA symbol may be transmitted on up to M CCs in one symbol period.

Wireless network 100 may support data transmission with hybrid automatic retransmission (HARQ) to improve reliability. For HARQ, a transmitter (e.g., an eNB) may send an initial transmission of a transport block and may send one or more additional transmissions of the transport block, if needed, until the transport block is decoded correctly by a receiver (e.g., a UE), or the maximum number of transmissions of the transport block has occurred, or some other termination condition is encountered. After each transmission of the transport block, the receiver may send an acknowledgement (ACK) if the transport block is decoded correctly, a negative acknowledgement (NACK) if the transport block is decoded in error, or a discontinuous transmission (DTX) if the transport block is missed. The transmitter may send another transmission of the transport block if a NACK or a DTX is received and may terminate transmission of the transport block if an ACK is received. A transport block may also be referred to as a packet, a codeword, a data block, etc.

Figure 5:
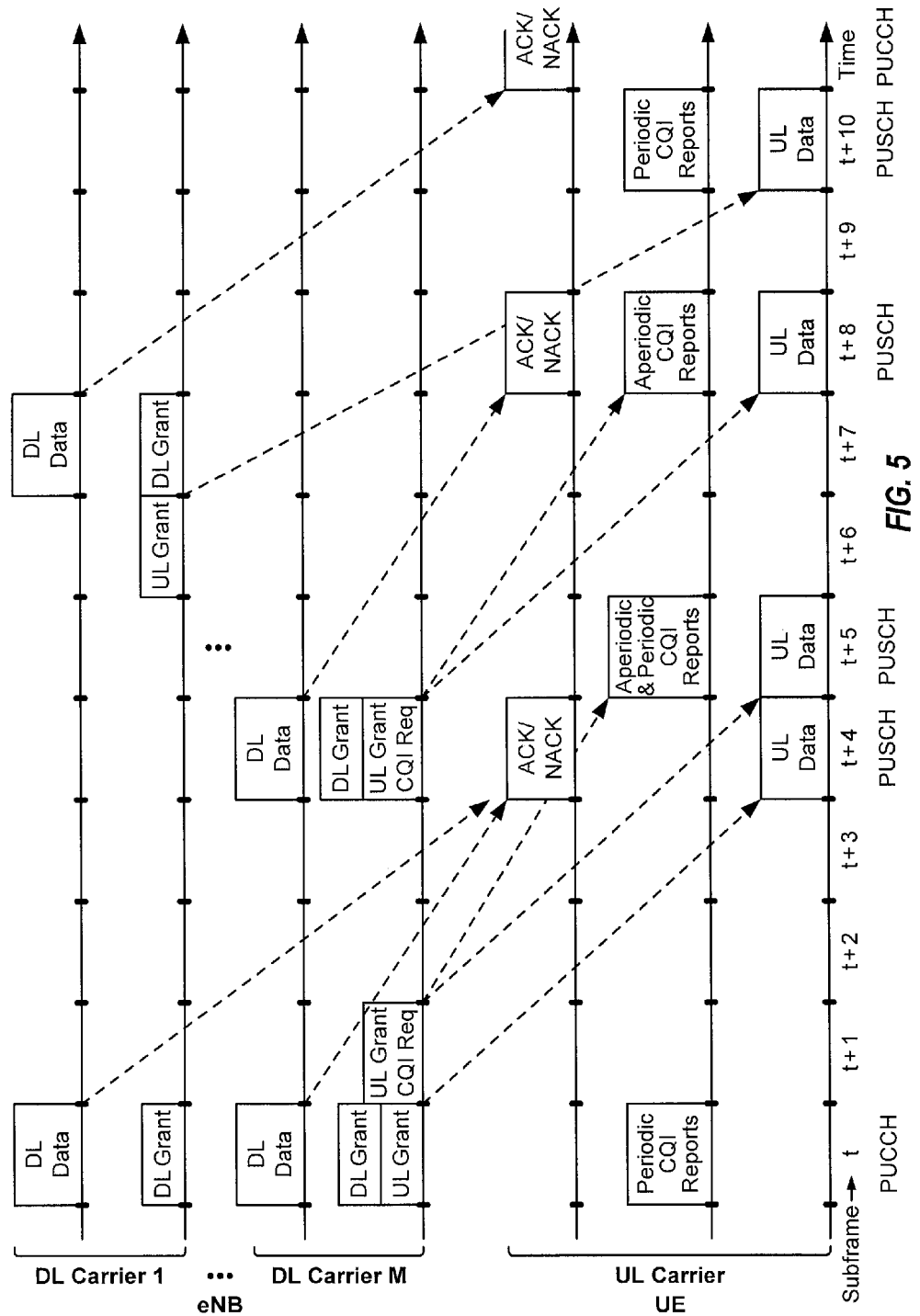
FIG. 5 shows aspects of data transmission on multiple CCs with HARQ.

FIG. 5 shows a scheme of transmitting DCI and data with HARQ on multiple (M) downlink CCs and transmitting UCI and data on one uplink CC. In this example, UE 120x may periodically estimate the channel quality of different downlink CCs for eNB 110x and may determine CSI for each downlink CC. The CSI may include channel quality indicator (CQI), precoding matrix indicator (PMI), rank indicator (RI), or a combination thereof. RI may indicate the number of layers or spatial channels to use for transmission of data. PMI may indicate a precoding matrix or vector to use for precoding data prior to transmission. CQI may indicate a channel quality for each transport block. UE 120x may periodically send CSI for each downlink CC to eNB 110x and/or may send CSI reports when triggered by eNB 110x.

eNB 110x may receive CSI for all downlink CCs configured for UE 120x and may use the CSI to select UE 120x for transmission of data, to schedule UE 120x on one or more downlink CCs and/or the uplink CC, and to select one or more modulation and coding schemes (MCSs) for each downlink CC on which UE 120x is scheduled. eNB 110x may process (e.g., encode and modulate) one or more transport blocks for each scheduled CC based on the one or more MCSs selected for that CC. eNB 110x may then send a transmission of one or more transport blocks (or a PDSCH transmission) on each scheduled CC to UE 120x.

UE 120x may receive and decode the transmission of one or more transport blocks on each scheduled CC in the plurality of configured CCs. For each configured CC, UE 120x may determine whether a transmission of one or more transport blocks is detected and, when a transmission is detected, whether each transport block is decoded correctly or in error. UE 120x may generate an ACK for each transport block decoded correctly and a NACK for each transport block decoded in error. UE 120x may send ACK/NACK information comprising ACKs and/or NACKs for all transport blocks received on all M downlink CCs in a particular subframe. eNB 110x may receive the ACK/NACK information from UE 120x, terminate transmission of each transport block for which an ACK is received, and send another transmission of each transport block for which a NACK is received. UE 120x may also transmit data to eNB 110x with the ACK/NACK information when there is data to send and when it has been scheduled for transmission of data on the uplink CC.

As shown in FIG. 5, eNB 110x may send a downlink grant to UE 120x for a PDSCH transmission on a downlink CC. The downlink grant may include various parameters for receiving and decoding the PDSCH transmission on the downlink CC. The downlink grant may be sent on the downlink CC on which the PDSCH transmission is sent or on another downlink CC. eNB 110x may also send an uplink (UL) grant for a data transmission on the uplink CC by UE 120x. The uplink grant may include various parameters for generating and sending the data transmission on a shared channel (e.g., PUSCH) of the uplink CC. The uplink grant may also include a CQI request. In this case, UE 120x may send CSI with data on the PUSCH.

UE 120x may transmit data and/or UCI, or neither, in a given subframe. The UCI may comprise only CSI, or only ACK/NACK, or both CSI and ACK/NACK. UE 120x may be configured to periodically send CSI for each downlink CC of interest, which may be referred to as periodic CQI reporting. In this case, the UE may periodically send CSI reports in designated subframes determined by a schedule for periodic CSI reporting. Each CSI report may comprise CQI, PMI and/or RI for one or more downlink CCs. UE 120x may also be requested to send CSI for one or more downlink CCs in any subframe, which may be referred to as aperiodic CSI reporting. This may be achieved by including a CSI request for one or more downlink CCs in an uplink grant.

eNB 110x may send DCI (e.g., a downlink grant and/or an uplink grant) to UE 120x on the PDCCH on a downlink CC. When UE 120x is scheduled for a data transmission, eNB 110x may send data on the PDSCH on a downlink CC. In a particular subframe, UE 120x may send UCI (e.g., CSI and/or ACK/NACK) on the PUCCH on an uplink CC to eNB 110x. Alternatively, when an uplink grant is received, UE 120x may send only data or both data and UCI on the PUSCH on an uplink CC.

In general, UE 120x may be configured with any number of downlink CCs and any number of uplink CCs for multi-carrier operation. For purposes of illustration in the description below, UE 120x may be configured with up to five downlink CCs and up to five uplink CCs for multi-carrier operation. In some examples, one downlink CC may be designated as a downlink primary CC (PCC), one uplink CC may be designated as an uplink PCC, and each remaining CC may be referred to as a secondary CC (SCC). eNB 110x may send certain information (e.g., grants, ACK/NACK, etc.) on the downlink PCC to UE 120x. UE 120x may send certain information (e.g., CSI, ACK/NACK, scheduling request, etc.) on the uplink PCC to eNB 110x.

Table 1 lists different types of CC referred to in the description herein.

TABLE 1

| CC Type | |
|---|---|
| CC Type | Description |
| Configured CC | A downlink CC that is configured for UE 120x. |
| Activated CC | A downlink CC that is configured and activated/enabled for use. |

TABLE 1-continued

| CC Type | |
|---|---|
| CC Type | Description |
| Scheduled CC | A downlink CC on which UE 120x is scheduled for data transmission. |
| Detected CC | A downlink CC on which UE 120x receives a data transmission. |

UE 120x may be semi-statically configured with M downlink CCs and one or more uplink CCs, e.g., via higher layer such as Radio Resource Control (RRC). In general, M may be any value greater than one. In one exemplary system, M may be less than or equal to five. Some or all of the configured CCs may be activated. An activated CC is a CC that a UE actively monitors on the downlink and/or actively transmits on the uplink. UE 120x may not monitor a deactivated CC on the downlink, even though the CC is one of the configured CCs, which would result in power savings. UE 120x may be scheduled for data transmission on all or a subset of the configured CCs in a given subframe. For dynamic scheduling, a downlink grant may be sent for a transmission of one or more transport blocks on each scheduled CC.

UE 120x may detect a downlink grant on the PDCCH for a PDSCH transmission on a downlink CC (a "detected CC"). UE 120x may receive the PDSCH transmission on the detected CC in accordance with the downlink grant. The downlink grant may be sent on the same downlink CC on which the associated PDSCH transmission is sent. In this case, the detected CC would be the downlink CC on which the downlink grant is received. The downlink grant may also be sent on one downlink CC, and the associated PDSCH transmission may be sent on a different downlink CC. For example, the downlink grant may include a carrier indication field (CIF) indicating the downlink CC on which the associated PDSCH transmission is sent. In that case, UE 120x may identify the detected CC based on the CIF in the downlink grant. UE 120x may detect some or all of the scheduled CCs, e.g., depending on whether UE 120x missed any downlink grants sent to UE 120x. UE 120x may receive PDSCH transmissions on all detected CCs.

UE 120x may be configured with M downlink CCs, and each downlink CC may be associated with a particular transmission mode in a set of supported transmission modes. Table 2 lists the transmission modes supported in LTE Release 9. Transmission modes 1, 2, 5, 6 and 7 support single-input single-output (SISO) or single-input multiple-output (SIMO) transmissions. Transmission modes 3, 4 and 8 support multiple-input multiple-output (MIMO) transmission.

TABLE 2

| Transmission Modes | | |
|---|---|---|
| Transmission Mode | Number of Transport Blocks | Description |
| 1 | 1 | Transmission from a single eNB antenna port |
| 2 | 1 | Transmit diversity |
| 3 | 2 | Open-loop spatial multiplexing |
| 4 | 2 | Closed-loop spatial multiplexing |
| 5 | 1 | Multi-user MIMO |
| 6 | 1 | Closed-loop rank 1 precoding |
| 7 | 1 | Transmission using UE-specific reference signal |
| 8 | 2 | Dual layer transmission |

A transmission mode may be independently configured for each downlink CC. The M downlink CCs for UE 120x may be configured with the same or different transmission modes.

One or more transport blocks may be sent on a downlink CC depending on the transmission mode configured for the downlink CC. In particular, one transport block may be sent on a downlink CC that is configured with transmission mode 1, 2, 5, 6 or 7, and two transport blocks may be sent on a downlink CC that is configured with transmission mode 3, 4 or 8. UE 120x may generate one ACK/NACK bit for each transport block. For example, one ACK/NACK bit may used to acknowledge a data transmission on a CC configured in transmission mode 1, 2, 5, 6 or 7 and two ACK/NACK bits may be used to acknowledge a data transmission on a CC configured in transmission mode 3, 4 or 8.

The number of ACK/NACK bits for acknowledging a transmission of one or more transport blocks on a downlink CC may also be dependent on a DCI format of a corresponding downlink grant. LTE supports a number of DCI formats. DCI format 1, 1A, 1B, 1C or 1D may be used to send a downlink grant for a transmission of one transport block and may thus be associated with one ACK/NACK bit. DCI formats 2, 2A or 2B may be used to send a downlink grant for a transmission of two transport blocks and may thus be associated with two ACK/NACK bits. A DCI format of a downlink grant may be associated with a particular number of transport blocks to send on a downlink CC, which may be different from (e.g., fewer than) the number of transport blocks associated with a transmission mode configured for the downlink CC. For example, CCj may be configured with a transmission mode supporting two transport blocks but may be scheduled with a downlink grant having a DCI format used with one transport block. In that case, eNB 110x may send one transport block on CCx and UE 120x may generate one bit of ACK/NACK information to acknowledge the data transmission on CCj.

In one example, UE 120x may be configured with five downlink CCs for multi-carrier operation in FDD. In this case, in a given subframe, eNB 110x may send up to ten transport blocks on the up to five downlink CCs, with up to two transport blocks per downlink CC. Up to ten ACK/NACK bits may be obtained for up to ten transport blocks, one ACK/NACK bit for each transport block (up to 12 ACK/NACK bits may be obtained if DTX is explicitly signaled). UE 120x may thus have N ACK/NACK bits for a data transmission over a set of M configured downlink CCs, where $1 \leq M \leq N \leq 10$.

According to the present disclosure, techniques for determining the number of ACK/NACK bits for a data transmission on M downlink CCs in a multi-carrier wireless communication network are described. The number of ACK/NACK bits for acknowledging a data transmission may be determined in different manners depending on the availability of certain information. The number of ACK/NACK bits, in turn, may be used to control transmission of ACK/NACK information. In one aspect, a downlink assignment index (DAI) may be used to facilitate determination of the number of ACK/NACK bits for a data transmission on M downlink CCs. A DAI may be included in a downlink grant. The DAI may indicate the number of downlink CCs scheduled and it may also provide an indication of which downlink CCs are scheduled. UE 120x can use information obtained from the DAI to detect missing downlink grants, facilitate more efficient ACK/NACK feedback, and/or provide other advantages.

The total number of ACK/NACK bits for M configured CCs may be referred to as the ACK/NACK bitwidth, the ACK/NACK payload size, etc. The ACK/NACK bitwidth may be dependent on whether ACK/NACK bits for different downlink CCs are ordered or non-ordered. The use of ordered or non-ordered feedback may be configured for UE 120x. For the non-ordered case, ACK/NACK bits for the M configured CCs may be concatenated in a predetermined order, e.g., based on an index of each downlink CC. For the ordered case, ACK/NACK bits for the M configured CCs may be concatenated by first considering ACK/NACK bits for the scheduled CCs and then considering ACK/NACK bits for the remaining CCs.

Figure 6:
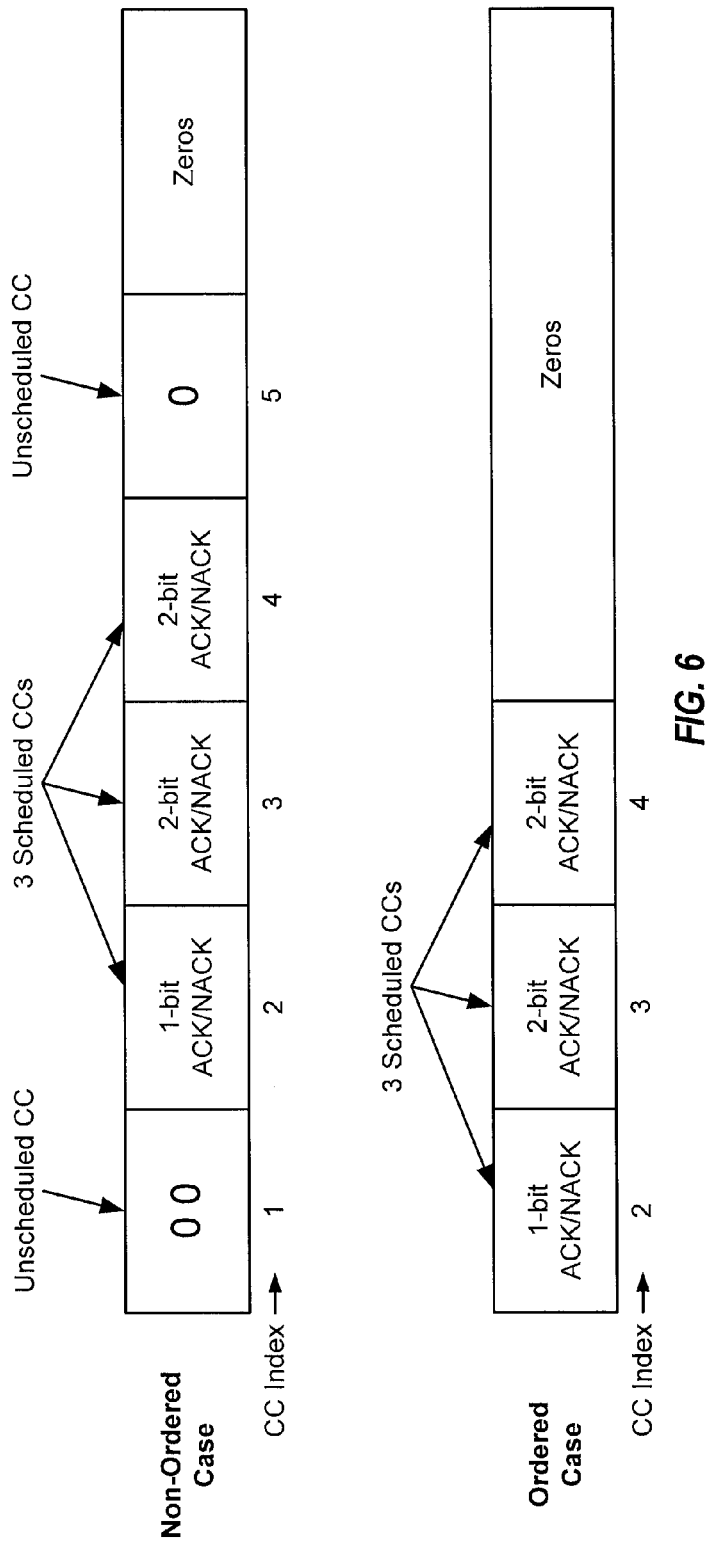
FIG. 6 shows an example of determining an ACK/NACK bitwidth in a multi-carrier wireless communication network.

FIG. 6 shows an example of determining ACK/NACK bitwidth for the ordered and non-ordered cases. In this example, UE 120x is configured with five downlink CCs (CC1-CC5). CC2 and CC5 are associated with 1-bit ACK/NACK feedback (e.g., based on transmission mode and DCI format as previously discussed). CC1, CC3 and CC4 are associated with 2-bit ACK/NACK feedback. Only CC2, CC3 and CC4 are scheduled in a particular subframe. A set of bits to be encoded and sent as ACK/NACK feedback may be determined as follows:

Non-ordered case: '00' (CC1)+1 bit (CC2)+2 bits (CC3)+2 bits (CC4)+'0' (CC5)+zeros, or Ordered case: 1 bit (CC2)+2 bits (CC3)+2 bits (CC4)+zeros.

ACK/NACK information may be sent on the PUCCH or PUSCH in a fixed payload size. In this case, zero padding with a sufficient number of zeros may be performed to obtain a set of bits of the proper payload size.

The non-ordered case may result in simpler operation since one or two ACK/NACK bits for each configured CC may be readily obtained from the ACK/NACK feedback based on the CC index and the number of ACK/NACK bits for each configured CC. However, the ordered case may have better efficiency since the ACK/NACK bits for the scheduled CCs are placed first and may thus result in fewer bits being used for ACK/NACK feedback. In some examples, CSI and/or other information may be multiplexed in the remaining bits of the payload after ACK/NACK information for the scheduled carriers is added.

Table 3 lists three DAI schemes for multi-carrier operation according to the present disclosure. In the first scheme, a DAI is not included in downlink grants. In the second and third schemes, a DAI is supported and conveys different information. Determination of ACK/NACK bitwidth based on each of the three schemes is described below.

TABLE 3

DAI Schemes

| Scheme | | Description |
|---|---|---|
| First Scheme | No DAI | Downlink grant does not include DAI. |
| Second Scheme | DAI indicates number of scheduled CCs | Downlink grant includes DAI indicating number of downlink CCs scheduled in a subframe. |
| Third Scheme | DAI identifies scheduled CCs | Downlink grant includes DAI indicating number of downlink CCs and which downlink CCs are scheduled in a subframe. |

In the second scheme, the DAI indicates the number downlink CCs being scheduled and may be set to a value within a range of 1 to M−1. In one example, the DAI may have a variable width, which may be dependent on M. For example, the DAI may include one bit for M=2, two bits for M=3 or 4, or three bits for M=5. In another example, the DAI may have a fixed width (e.g., of three bits) that is independent of M. The DAI may be included in a downlink grant for each scheduled CC or for only certain scheduled CCs.

In the third scheme, the DAI indicates the number of downlink CCs being scheduled as well as an identifier of the scheduled CCs. The DAI may be included in a downlink grant for a scheduled CC and may indicate which other downlink CCs (if any) are also scheduled. With the third scheme, the DAI may be defined in different manners.

In one variation of the third scheme, the DAI may have a variable width that is dependent on M. The number of bits used for the DAI may be smaller than the number of configured CCs. For example, if M=1, then the DAI may be omitted. If M=2, then the DAI may comprise one bit and may be set to (i) a first value (e.g., '0') to indicate one downlink CC being scheduled, which is the downlink CC associated with the downlink grant including the DAI, or (ii) a second value (e.g., '1') to indicate two downlink CCs being scheduled. If M=3, then the DAI may comprise two bits and may be set to (i) a first value (e.g., '00') to indicate one downlink CC being scheduled, (ii) a second value (e.g., '01') to indicate a first remaining downlink CC also being scheduled, (iii) a third value (e.g., '10') to indicate a second remaining downlink CC also being scheduled, or (iv) a fourth value (e.g., '11') to indicate all three downlink CCs being scheduled.

To further illustrate matters, consider the case of three configured CCs (CCx, CCy and CCz). The eNB may set the DAI in a downlink grant for CCx to the second value to indicate that CCy is scheduled, or to the third value to indicate that CCz is scheduled. If M=4, a 3-bit DAI may be utilized. The DAI may be set to (i) a first value to indicate one downlink CC being scheduled, (ii) a second, a third, or a fourth value to indicate one other downlink CC also being scheduled among the three remaining downlink CCs, (iii) a fifth, a sixth, or a seventh value to indicate two other downlink CCs also being scheduled among the three remaining downlink CCs, or (iv) an eight value to indicate all four downlink CCs being scheduled.

Continuing with this example, a 4-bit DAI may be utilized when M=5. The DAI may be set to (i) a first value to indicate one downlink CC being scheduled, (ii) a value within the 2nd through 5th value to indicate one other downlink CC also being scheduled among the four remaining downlink CCs, (iii) a value within the 6th through 11th value to indicate two other downlink CCs also being scheduled among the four remaining downlink CCs, (iv) a value within the 12th through 14th value to indicate three other downlink CCs also being scheduled among the four remaining downlink CCs, or (v) a 15th value to indicate all five downlink CCs being scheduled. When the variable width DAI of the third scheme is utilized, UE 120x may be able to determine how many downlink CCs and which downlink CCs are scheduled based on the DAI in one downlink grant for one scheduled CC.

In another variation of the third scheme, the DAI may comprise a bitmap of M-1 bits, with one bit for each remaining downlink CC (not including the downlink CC on which the PDCCH is received). The bit for each remaining downlink CC may be set to a first value (e.g., '0') to indicate the downlink CC is not scheduled or to a second value (e.g., '1') to indicate the downlink CC is scheduled. The number of downlink CCs being scheduled may be equal to 1 (for the downlink CC associated with a downlink grant carrying the DAI) plus the number of ones in the bitmap.

Figure 7:
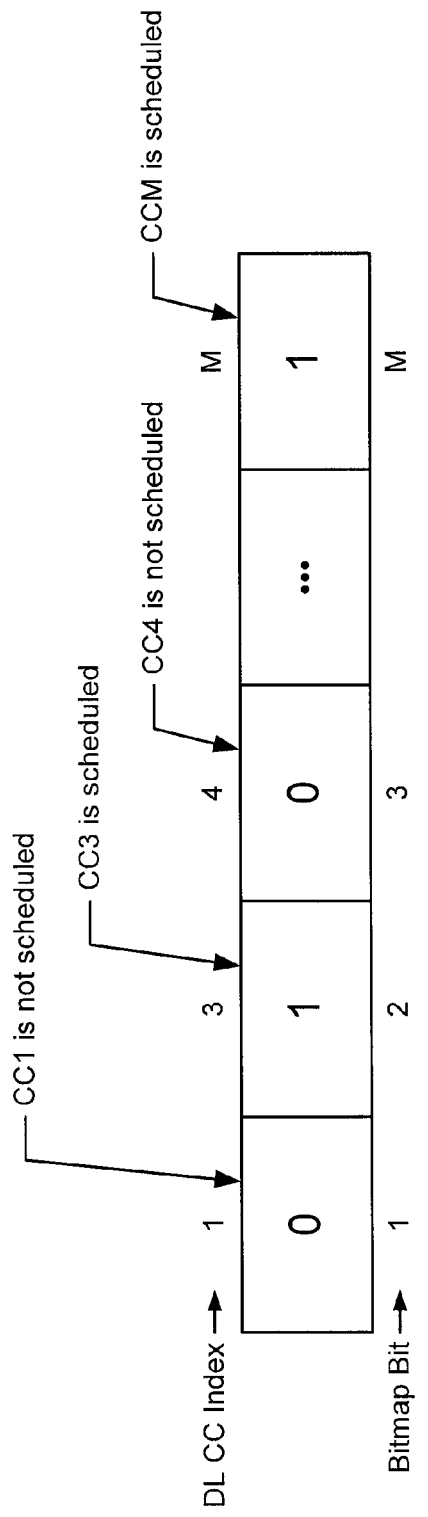
FIG. 7 shows an example of a downlink assignment index (DAI) for a multi-carrier wireless communication network.

FIG. 7 shows an example of the DAI for the bitmap variation of the third scheme. In this example, the DAI is included in a downlink grant for a PDSCH transmission on downlink CC2 and comprises a bitmap of M-1 bits for M-1 other downlink CCs. The bit for CC1 is set to '0' to indicate CC1 not being scheduled, the bit for CC3 is set to '1' to indicate CC3 being scheduled, etc. UE 120x may receive the DAI in a downlink grant for a PDSCH transmission on one scheduled CC. Based on the DAI, UE 120x can determine all scheduled CCs based on the DAI in the received downlink grant, even if it does not detect the downlink grants for all of the other scheduled CCs.

In another variation, the DAI may comprise a limited number of bits, and only some scheduled CCs may be identified by the DAI. For example, the DAI may comprise two bits (instead of M-1 bits) even when more than two downlink CCs are scheduled. In this variation, the downlink PCC may be given higher priority than the downlink SCCs. For M=3, the DAI can identify each downlink CC that is scheduled, as described above. For M=4, the DAI in a downlink grant for the PCC may include one bit covering two SCCs and another bit covering the last SCC. The DAI in a downlink grant for an SCC may include one bit covering the PCC and another bit covering the other two SCCs. For M=5, the DAI in a downlink grant for the PCC may include one bit covering two SCCs and another bit covering the last two SCCs. The DAI in a downlink grant for an SCC may include one bit covering the PCC and another bit covering the other three SCCs. In this variation, two or more entries may share the same DAI value. For example, the same DAI value (e.g., '00') may be used for the case of one scheduled CC and another case of four scheduled CCs, since the probability of confusion between these two cases may be small. This may allow for a tradeoff between overhead and ambiguity in the information provided by the DAI.

As described herein, further variations of the DAI in the second and third schemes may also utilized. Additionally, the DAI may convey different information depending upon the CC configuration for a particular UE. For example, different DAI schemes may be utilized in connection with different CC configurations or in support of different UEs.

A DAI indicating the number of scheduled CCs and/or identifying the scheduled CCs may be sent in various manners. In one example, the DAI may be included in each downlink grant sent on the PDCCH for each scheduled CC. In another example, the DAI may be included only in downlink grants for the downlink PCC. In yet another example, the DAI may be included in one or more downlink grants for one or more designated CCs, e.g., the first and last CCs. Additionally or alternatively, a DAI for downlink data transmission may be included in an uplink grant sent on the PDCCH. This design may provide additional protection against missed detection of the PDCCH by a UE.

The ACK/NACK bitwidth for M configured CCs may be determined in various manners for the three schemes listed in Table 3. Some exemplary designs of determining the ACK/NACK bitwidth are described below.

For the first scheme with no DAI, an exemplary ACK/NACK bitwidth for M configured CCs may be determined as follows:

$$n_{HARQ} = \sum_{C \in Configured\_Set} n_C, \quad \text{Eq (1)}$$

where $n_C$ is the number of ACK/NACK bits for downlink CC C, $n_{HARQ}$ is the total number of ACK/NACK bits for M configured CCs, and Configured_Set denotes a set of configured CCs.

$n_{HARQ}$ is the ACK/NACK bitwidth for the M configured CCs. $n_{HARQ}$ in equation (1) may be the same for both the ordered and non-ordered cases.

In another design, the ACK/NACK bitwidth for cases where no DAI is provided may be determined as follows:

$$n_{HARQ} = \sum_{C \in Activated\_Set} n_C, \quad \text{Eq (2)}$$

where Activated_Set denotes a set of activated CCs. The set of activated CCs may include all or a subset of the M configured CCs.

In yet another design, in the absence of DAI, the ACK/NACK bitwidth may be determined as follows:

$$n_{HARQ} = \sum_{C \in Detected\_Set} n_C, \quad \text{Eq (3)}$$

where Detected_Set denotes a set of detected CCs. The set of detected CCs may include all or a subset of the M configured CCs. Detected CCs may be determined as described above.

As shown in equation (3), when the detected CCs are known from the detection of downlink grants, the ACK/NACK bitwidth may be determined based on the ACK/NACK bits for only the detected CCs. This may result in a smaller and more accurate ACK/NACK bitwidth.

$n_C$ in equations (1) to (3) may be defined in the same manner or different manners. For example, $n_C$ in equation (1) may be determined based on a transmission mode of each CC in the configured set, whereas $n_C$ in equation (3) may be determined based on a DCI format of a downlink grant for the CCs in the detected set.

For the second scheme with DAI indicating the number of scheduled CCs, the ACK/NACK bitwidth for M configured CCs may be determined differently for the ordered and non-ordered cases described above. In one example of the non-ordered case, ACK/NACK bitwidth may be determined based on the configured CCs, as shown in equation (1). Although only a subset of the M configured CCs may be scheduled, the DAI may not indicate which particular downlink CCs are scheduled. Hence, the UE may determined an ACK/NACK bitwidth based on a number of ACK/NACK bits for all M configured CCs.

When ordered feedback is used with the second scheme, ACK/NACK bitwidth may be determined in different manners. In one example, the ACK/NACK bitwidth may be determined as follows:

$$n_{HARQ} = \begin{cases} n_C & \text{for } DAI = 1 \\ DAI * \max(n_C) & \text{for } 1 < DAI < M \\ \sum_{C \in Configured\_Set} n_C & \text{for } DAI = M \end{cases} \quad \text{Eq (4)}$$

In equation (4), the ACK/NACK bitwidth varies according to the number of scheduled CCs and may be equal to the number of ACK/NACK bits for the CC on which PDCCH is transmitted when one downlink CC is scheduled (with DAI=1). The ACK/NACK bitwidth may be equal to the total number of ACK/NACK bits for all M configured CCs if all configured CCs are scheduled (with DAI=M). The ACK/NACK bitwidth and may be equal to the number of scheduled CCs times the maximum number of ACK/NACK bits per scheduled CC if two to M−1 downlink CCs are scheduled. Since DAI*max($n_C$) may be larger than $\Sigma n_C$, $n_{HARQ}$ may be limited to $\Sigma n_C$.

In another example, when ordered feedback is used with the second scheme, the ACK/NACK bitwidth may be determined as follows:

$$n_{HARQ} = \begin{cases} n_C & \text{for } DAI = 1 \\ n_X & \text{for } 1 < DAI < M \\ \sum_{C \in Configured\_Set} n_C & \text{for } DAI = M \end{cases} \quad \text{Eq (5)}$$

$$n_X = \max\{n_1, \ldots, n_{M-DAI+1}\} + \max\{n_2, \ldots, n_{M-DAI+2}\} + \ldots + \max\{n_{DAI}, \ldots, n_M\} \quad \text{Eq (6)}$$

In equation (6), for a given DAI value, the first scheduled CC is among downlink CCs 1 through M−DAI+1, the second scheduled CC is among downlink CCs 2 through M−DAI+2, and so on, and the last scheduled CC is among downlink CCs DAI to M. This observation is exploited in equation (6) to possibly reduce the ACK/NACK bitwidth. Since $n_X$ may be larger than $\Sigma n_C$, $n_{HARQ}$ may be limited to $\Sigma n_C$. For example, UE 120x may be configured with five downlink CCs associated with 1, 2, 1, 2 and 1 ACK/NACK bits based on the transmission modes configured for these downlink CCs. In this example, $\Sigma n_C$ is equal to 7 bits. If four downlink CCs are scheduled and DAI=4, then $n_X$ is equal to 8 and is larger than $\Sigma n_C$. In this case, $n_{HARQ}$ may be limited to 7. Conversely, if three downlink CCs are scheduled and DAI=3, then $n_X$ is equal to 6 and is smaller than $\Sigma n_C$. In this case, $n_{HARQ}$ is equal to 6. For the case of two downlink CCs, $n_{HARQ}$ may be set to $\Sigma n_C$.

For the third scheme in which a DAI identifies both the number and identity of the scheduled CCs, the ACK/NACK bitwidth for M configured CCs may be determined as follows:

$$n_{HARQ} = \sum_{C \in Scheduled\_Set} n_C, \quad \text{Eq (7)}$$

where Scheduled_Set denotes a set of scheduled CCs.

As shown in equation (7), when the scheduled CCs are known from the DAI, the ACK/NACK bitwidth may be determined based on the ACK/NACK bits for only the scheduled CCs. For example, the number of ACK/NACK bits for each scheduled CC may be determined based on (i) the transmission mode configured for the scheduled CC or (ii) the DCI format of a downlink grant for the scheduled CC. This would increase efficiency by facilitating a more accurate determination of the ACK/NACK bitwidth.

Table 4 summarizes the determination of ACK/NACK bitwidth for the three schemes listed in Table 3.

TABLE 4

ACK/NACK Bitwidth Determination

| Scheme | Non-ordered Case | Ordered Case | Comments |
|---|---|---|---|
| No DAI | $\Sigma n_C$ over configured CCs or detected CCs | Same as non-ordered case | Fixed ACK/NACK overhead if sum over configured CCs. |
| DAI indicates number of scheduled CCs | $\Sigma n_C$ over configured CCs | Equation (4) or Equations (5) & (6) | Ordered ACK/NACK feedback may be more efficient. |
| DAI identifies scheduled CCs | $\Sigma n_C$ over scheduled CCs | Same as non-ordered case | Minimum ACK/NACK overhead. |

In one example of operation, which may be applicable for all three schemes listed in Table 3, UE 120x may determine the total number of transport blocks received on the M configured CC. UE 120x may detect for downlink grants intended for UE 120x and may determine the DCI format of each detected downlink grant. UE 120x may receive one transport block on each downlink CC associated with a downlink grant having a DCI format supporting one transport block. UE 120x may receive two transport blocks on each downlink CC associated with a downlink grant having a DCI format supporting two transport blocks. UE 120x may determine the total number of transport blocks received on all configured CCs as follows:

$$n_{TB} = \sum_{C \in Detected\_Set} n_{TB,C}, \quad \text{Eq (8)}$$

where $n_{TB,C}$ is the number of transport blocks received on downlink CC C, and $n_{TB}$ is the total number of transport blocks received on all configured CCs.

The total number of transport blocks received on all configured CCs ($n_{TB}$) may be referred to as a total transport block count. UE 120x may determine the ACK/NACK bitwidth based on the total transport block count, e.g., one ACK/NACK bit for each received transport block, so that $n_{HARQ}=n_{TB}$. The number of transport blocks received on each downlink CC may be equal to or less than the number of transport blocks for a transmission mode configured for that downlink CC. Hence, the total transport block count determined based on detected downlink grants may be equal to or less than the ACK/NACK bitwidth determined based on transmission modes of the configured CCs or detected CCs. The CK/NACK bitwidth determined based on transmission modes may be considered as (i) the maximum possible number of ACK/NACK bits for M configured CCs, or (ii) the total number of bits available to send ACK/NACK information for the M configured CCs. The total transport block count may be considered as the actual number of ACK/NACK bits to send for the M configured CCs.

UE 120x may send ACK/NACK information for M configured CCs on either the PUCCH or PUSCH in a given subframe, e.g., depending on whether UE 120x is also scheduled for data transmission on the uplink in the subframe. The ACK/NACK bitwidth and/or the total transport block count may be used for various purposes such as one or more of the following:

Power control of ACK/NACK information sent on the PUCCH,

Determination of a number of resource elements for sending ACK/NACK information on the PUSCH, Determination of an ACK/NACK feedback scheme for sending ACK/NACK information on the PUCCH, Determination of a code rate and/or a coding scheme for sending ACK/NACK information on the PUCCH or PUSCH, and Determination of available bits for sending CSI and/or other information with ACK/NACK information on the PUCCH or PUSCH.

A multi-carrier UE may also perform power control for the PUCCH based on the ACK/NACK bitwidth or the total transport block count. In general, the signal-to-noise ratio (SNR) needed to reliably receive an ACK/NACK transmission may be dependent on the ACK/NACK bitwidth, or the number of ACK/NACK bits to send. The ACK/NACK bitwidth may, in turn, be dependent on the number of scheduled CCs. Since the required SNR may vary by more than 3 dB, e.g., for one scheduled CC versus five scheduled CCs, accurate determination of ACK/NACK bitwidth is important for efficient operation in a multi-carrier network.

The transmit power to use to send ACK/NACK information and possibly CSI on the PUCCH may be determined as follows:

$$P_{PUCCH}=f\{h(n_{CSI},n_{HARQ})\}, \quad \text{Eq (9)}$$

where $n_{CSI}$ is the number of CSI bits to send with ACK/NACK information, h(.) is a predefined function described in LTE, f(.) is another predefined function described in LTE, and $P_{PUCCH}$ is the transmit power for the PUCCH.

As shown in equation (9), the transmit power of the PUCCH may be dependent on the number of ACK/NACK bits to send, or ACK/NACK bitwidth. The ACK/NACK bitwidth for power control of the PUCCH may be determined in various manners. In a first example, which may be referred to as a slow option, ACK/NACK bitwidth may be determined based on the configured CCs for UE 120x, which may be computed as shown in equation (1) for the first scheme. In a second example, which may be referred to as a medium option, the ACK/NACK bitwidth may be determined based on the activated CCs for UE 120x, which may be computed as shown in equation (2) for the first scheme. In a third example, which may be referred to as a fast option, the ACK/NACK bitwidth may be determined based on the detected CCs carrying data on the PDSCH, which may be computed as shown in equation (3) for the first scheme.

Other approaches may also include determining ACK/NACK bitwidth based on the scheduled CCs. For example, ACK/NACK bitwidth may be determined over the set of scheduled CCs as when the DAI identifies both number and identity of each scheduled CC, e.g., as shown in equation (7). Alternatively, the ACK/NACK bitwidth may be determined based on the total number of transport blocks received on the M configured CCs, e.g., as shown in equation (8). The ACK/NACK bitwidth may also be depend upon whether an ordered or non-order feedback configuration is utilized as previously discussed.

The slow and medium options may result in "over" power control since UE 120x may be scheduled on fewer downlink CCs than the configured CCs. UE 120x may then use higher transmit power for the PUCCH than necessary. The fast option may result in "under" power control since UE 120x may miss detecting downlink grants on the PDCCH for some scheduled CCs. UE 120x may then use less transmit power for the PUCCH than necessary. However, the likelihood of missing detection of downlink grants may be low (e.g., typically around 1% for each downlink CC). Hence, the under power control issue may not be severe.

Power control of the PUCCH can be performed by eNB 110x to mitigate the potential for a power control mismatch as described above. For the slow and medium options, eNB 110x may determine a power down command based on the difference between the number of scheduled CCs and the number of configured or activated CCs. For the fast option, eNB 110x may determine a power up command based on the difference between an estimate of the number of detected CCs by UE 120x (which is unknown to eNB 110x) and the number of scheduled CCs (which is known to eNB 110x). For all options, eNB 110x may send a power control command (which may be a power down command or a power up command) to UE 120x. The power control command may be sent via embedded information in a downlink grant, or via group power control in DCI formats 3/3A, or via some other mechanism. UE 120x may adjust its computed transmit power for the PUCCH based on the power control command.

For transmissions on PUSCH, the number of resource elements to use to send ACK/NACK information (which may be referred to as the required number of PUSCH resource elements) may be determined based on the ACK/NACK bitwidth or the total transport block count. In one example, UE 120x may determine a number of PUSCH resource elements based on the ACK/NACK bitwidth for the configured CCs, which may be computed as shown in equation (1) for the no-DAI case. In a second example, UE 120x may determine the number of PUSCH resource elements for acknowledging a data transmission based on the ACK/NACK bitwidth for the activated CCs, which may be computed as shown in equation (2) for the no-DAI case. In a third example, UE 120x may determine the number of PUSCH resource elements based on the ACK/NACK bitwidth for the detected CCs, which may be computed as shown in equation (3) for the no-DAI case. In other examples, UE 120x may determine the number of PUSCH resource elements based on (i) the ACK/NACK bitwidth for the scheduled CCs, which may be determined as shown in equation (7) for the third scheme, or (ii) the total number of transport blocks received on the M configured CCs, which may be determined as shown in equation (8).

In each of the above examples, the number of PUSCH resource elements for acknowledging a data transmission may be reserved or set aside from among all resource elements available on the PUSCH. UE 120x may send ACK/NACK information on the reserved resource elements on the PUSCH. Data and/or other information may be sent on the remaining resource elements on the PUSCH. eNB 110x may configure UE 120x for a particular resource utilization scheme on the PUSCH to avoid misalignment.

When UE 120x determines that ACK/NACK information is sent on the PUCCH, ACK/NACK feedback scheme may be determined based on the ACK/NACK bitwidth or the total transport block count. For example, up to two bits of ACK/NACK information may be sent on the PUCCH based on PUCCH format 1a or 1b. PUCCH format 1a supports transmission of one ACK/NACK bit on the PUCCH and may be used when one downlink CC is scheduled. PUCCH format 1b supports transmission of two ACK/NACK bits on the PUCCH and may be used when two transport blocks are scheduled on one downlink CC or one transport block is scheduled on each of two downlink CCs.

Up to four bits of ACK/NACK information may be sent on the PUCCH based on PUCCH format 1b and channel selection. In this example, two signaling bits, $b_0$ and $b_1$, may be sent on one of multiple PUCCH resources available for use by UE 120x. The values of bits by and $b_1$ as well as the selected PUCCH resource may be determined based on the ACK/NACK information.

When UE 120x is configured for PUCCH format 3, which utilizes DFT-spread OFDM (DFT-S-OFDM), more than four bits of ACK/NACK information may be sent on the PUCCH. For PUCCH format 3, $n_{HARQ}$ bits of ACK/NACK information may be transformed to the frequency domain based on a DFT and mapped to resource elements in one or more resource blocks used for ACK/NACK transmission. SC-FDMA symbols may be generated based on the mapped symbols.

PUCCH format 3 may be used to send ACK/NACK information regardless of the number of downlink CCs. This approach allows the same PUCCH format to be used irrespective of the number of configured CCs or scheduled CCs. For example, eNB 110x may process the ACK/NACK information based on one PUCCH format (instead of having to perform blind detection for different PUCCH formats). Additionally, using the additional payload available with PUCCH format 3, UE 120x can multiplex CSI and/or other information with ACK/NACK information. PUCCH format 3 may also be used to send only CSI, which may simplify operation of eNB 110x to detect for CSI and/or ACK/NACK information from UE 120x.

All or a subset of the designs described above may be used to send ACK/NACK information on the PUCCH. For example, PUCCH format 1a/1b and PUCCH format 3 may be used as appropriate. The ACK/NACK bitwidth for selecting a suitable ACK/NACK feedback scheme may be determined based on the configured CCs, the activated CCs, the detected CCs, or the scheduled CCs.

UE 120x can select a code rate and/or a coding scheme for ACK/NACK information based on the ACK/NACK bitwidth or the total transport block count. The ACK/NACK information may be encoded based on a block code (e.g., a Reed-Muller code) of a particular code rate to obtain coded data. The coded data may be further processed and sent on the PUCCH or PUSCH. Selection of a suitable code rate may be especially relevant for ACK/NACK information sent on the PUCCH based on PUCCH format 3 as well as for ACK/NACK information multiplexed with data on the PUSCH.

As described above, the number of bits of ACK/NACK information ($n_{HARQ}$) may be variable and dependent on the ACK/NACK bitwidth. The number of bits of coded data ($n_{PAYLOAD}$), on the other hand, may be fixed and dependent on the available payload for ACK/NACK information on the PUCCH or PUSCH. The code rate may be selected based on $n_{HARQ}$ and $n_{PAYLOAD}$ so that the coded data can be sent in the available payload on the PUCCH or PUSCH. The code rate may be determined based on the ACK/NACK bitwidth for the configured CCs, the activated CCs, the detected CCs, or the scheduled CCs. Selecting the code rate based on the ACK/NACK bitwidth for the configured CCs may ensure that eNB 110x and UE 120x will both use the same code rate. Selecting the code rate based on the ACK/NACK bitwidth for the activated CCs or the detected CCs may provide better performance with an increased possibility of misalignment between the code rate determined by eNB 110x and the code rate determined by UE 120x. In one example, eNB 110x performs decoding for different possible code rates to address possible misalignments. Fast adaptation based on the detected CCs may enable the use of different basis sequences for the block code.

The number of bits available to send CSI and/or other information may also be determined based on the ACK/NACK bitwidth or the total transport block count. ACK/NACK information, CSI, and/or other information may be multiplexed, and the resultant UCI may be sent on the PUCCH or PUSCH. One PUCCH or one PUSCH can support feedback of both ACK/NACK information and CSI simultaneously, which may be jointly encoded. The available payload for UCI on the PUCCH or PUSCH may be fixed and may be denoted as $n_{PAYLOAD}$. For example, up to 13 information bits may be sent on the PUCCH based on PUCCH format 3.

In one example, the number of bits available to send CSI and/or other information, $n_{CSI}$, is determined based on the ACK/NACK bitwidth or the total transport block count, as follows:

$$n_{CSI} = n_{PAYLOAD} - n_{HARQ}. \qquad \text{Eq (10)}$$

$n_{HARQ}$ in equation (10) may be determined based on the ACK/NACK bitwidth for the configured CCs, the activated CCs, or the detected CCs, or the scheduled CCs. $n_{HARQ}$ in equation (10) may also be determined based on the total transport block count. $n_{HARQ}$ may be determined based on the DAI, if available. $n_{HARQ}$ may also be dependent on whether the ACK/NACK information is ordered or not ordered.

eNB 110x may control the number of ACK/NACK bits in view of potential feedback overhead for CSI. For example, eNB 110x may schedule up to five downlink CCs in a subframe if there is only 4-bit wideband CSI feedback to report with the ACK/NACK information. Similarly, eNB 110x may schedule one or two downlink CCs with 2-bit ACK/NACK feedback in a particular subframe when 11-bit CSI feedback is expected and would be multiplexed with the ACK/NACK information. eNB 110x may thus schedule a number of downlink CCs such that the total overhead for ACK/NACK feedback and CSI feedback can fit in the available payload for UCI.

Table 5 lists four exemplary designs of sending ACK/NACK information. Each of the four ACK/NACK designs is described in further detail below.

TABLE 5

ACK/NACK Designs

| ACK/NACK Design | | Description |
|---|---|---|
| First Design | No DAI | No DAI for downlink CCs. CSI not multiplexed with ACK/NACK. |
| Second Design | No DAI | No DAI for downlink CCs. CSI can be multiplexed with ACK/NACK. |
| Third Design | DAI indicates number of scheduled CCs | DAI indicates number of downlink CCs scheduled in a subframe. CSI can be multiplexed with ACK/NACK. |
| Fourth Design | DAI identifies scheduled CCs | DAI indicates number of downlink CCs and identifies the scheduled CCs in a subframe. CSI can be multiplexed with ACK/NACK. |

In the first ACK/NACK design, DAI is not used for downlink CCs (but may be used for downlink subframes in TDD as described below). The ACK/NACK bitwidth or the total transport block count for power control of the PUCCH carrying ACK/NACK information may be determined based on detected CCs, e.g., as shown in equation (3) or (8). The ACK/NACK bitwidth or the total transport block count for determining the number of resource elements for sending ACK/NACK information on the PUSCH may be determined based on configured CCs, e.g., as shown in equation (1).

When DAI is not available, UE 120x may be configured to drop CSI when it collides with ACK/NACK information in a subframe and the ACK/NACK information comprises more than two bits. In particular, UE 120x may not multiplex CSI with ACK/NACK information when DAI is not available and it determines that there are more than two bits of ACK/NACK feedback. If there is only one or two ACK/NACK bits, then ACK/NACK information may be multiplexed with CSI as described in LTE Release 8.

In situations where DAI is not utilized, it is possible to reduce DCI overhead. However, without the additional information about scheduled CCs, there may be errors in determining the ACK/NACK bitwidth, which may result in some errors in determination of transmit power for the PUCCH or the number of resource elements in the PUSCH to send ACK/NACK information. Determining the ACK/NACK bitwidth based on the detected CCs for PUCCH power control and based on the configured CCs for counting resource elements on the PUSCH as described herein may mitigate the impact of such errors.

The second ACK/NACK design also does not utilize DAI but provides for multiplexing ACK/NACK with CSI on the PUCCH or PUSCH. The ACK/NACK bitwidth or the total transport block count for ascertaining the number of bits available to send CSI and/or other information may be determined based on the configured CCs, the activated CCs, or the detected CCs. Allowing CSI to be multiplexed with ACK/NACK information may result in less frequent dropping of CSI, which may improve performance of data transmission.

In the third ACK/NACK design, a DAI may be included in a downlink grant and may indicate the number of downlink CCs scheduled in a subframe, i.e., the total number of PDSCH transmissions. UE 120x may perform various functions based on the DAI. For example, UE 120x may determine the ACK/NACK bitwidth based on the DAI, as shown in equation (4) or (5). UE 120x may then determine the transmit power for sending ACK/NACK information on the PUCCH, the number of resource elements for sending ACK/NACK information on the PUSCH, the ACK/NACK feedback scheme for sending ACK/NACK information, the number of bits available to send CSI and/or other information, the code rate for encoding ACK/NACK information, etc. based on the ACK/NACK bitwidth or the total transport block count. UE 120x may also utilize the DAI to reduce PDCCH blind detection and lower the associated probability of false alarms. In particular, UE 120x may utilize explicit information on the number of scheduled CCs obtained from the DAI to determine when to stop decoding the PDCCH and avoid processing downlink CCs that do not include any downlink grants.

In the fourth ACK/NACK design, a DAI may be included in a downlink grant and may indicate both the number of downlink CCs scheduled in a subframe and the identify the scheduled CCs, i.e., the total number and position of the scheduled CCs. CC identity may be signaled, for example, when the bits of the DAI correspond to different ones of the CCs configured for UE 120x. Using information from the DAI, UE 120x may perform various functions. For example, UE 120x may accurately determine the ACK/NACK bitwidth based on the scheduled CCs indicated by the DAI, as shown in equation (7). UE 120x may also accurately determine the transmit power for sending ACK/NACK information on the PUCCH, the number of resource elements for sending ACK/NACK information on the PUSCH, the ACK/NACK feedback scheme for sending ACK/NACK information, the number of bits available to send CSI and/or other information, the code rate for encoding ACK/NACK information, etc. based on the ACK/NACK bitwidth or the total transport block count. UE 120x may also utilize the DAI to determine which downlink CCs to decode the PDCCH for downlink grants and which downlink CCs to skip.

Table 6 summarizes transmission of ACK/NACK information on the PUCCH for the three schemes listed in Table 3.

TABLE 6

ACK/NACK Transmission on PUCCH

| Scheme | Description |
| --- | --- |
| No DAI | PUCCH power control based on detected CCs. |
| DAI indicates number of scheduled CCs | PUCCH power control based on DAI. Some leftover room for multiplexing CSI with ACK/NACK. Improved PDCCH blind detection and false alarm probability. |
| DAI identifies scheduled CCs | PUCCH power control based on DAI. Accurate ACK/NACK bitwidth determination. Maximum leftover room for multiplexing CSI with ACK/NACK. Improved PDCCH blind detection and false alarm probability. |

Table 7 summarizes transmission of ACK/NACK information on the PUSCH for the three schemes listed in Table 3.

TABLE 7

ACK/NACK Transmission on PUSCH

| Scheme | Description |
| --- | --- |
| No DAI | Number of resource elements for ACK/NACK information determined based on configured CCs or activated CCs. |
| DAI indicates number of scheduled CCs | Number of resource elements for ACK/NACK information determined based on DAI. Improved PDCCH blind detection and false alarm probability. |
| DAI identifies scheduled CCs | Number of resource elements for ACK/NACK information determined based on DAI. Accurate ACK/NACK bitwidth determination. Improved PDCCH blind detection and false alarm probability. |

UE 120x may be configured with semi-persistent scheduling (SPS) on the downlink. For SPS, UE 120x may be semi-statically configured with pertinent parameters for data transmission on a downlink CC, and each PDSCH transmission may occur without sending a downlink grant on the PDCCH. SPS may be supported on only the downlink PCC or on any downlink CC configured for UE 120x.

When SPS is present (possibly on only the downlink PCC), misalignment between eNB 110x and UE 120x may occur even if a DAI is present in downlink grants sent on downlink SCCs. For example, UE 120x may be configured with two downlink CCs, with CC1 being a PCC and CC2 being an SCC. UE 120x may be configured for SPS on the PCC without DAI and may be dynamically scheduled on the SCC with DAI. If UE 120x fails to detect the PDCCH for CC2, it may not know whether there is (i) only an SPS transmission on CC1, or (ii) both an SPS transmission on CC1 and a dynamically scheduled transmission on CC2, or (iii) dynamically scheduled transmissions on both CC1 and CC2 (with the dynamically scheduled transmission on CC1 superseding an SPS transmission).

The situation described above may be addressed in various manners. In one example, UE 120x may behave as if the DAI is not included in downlink grants. UE 120x may then perform PUCCH power control based on detected CCs, determine the number of PUSCH resource elements based on configured CCs, etc. In another example, the DAI may include information for the PCC regardless of whether an SPS transmission or a dynamically scheduled transmission is sent on the PCC. In yet another example, the DAI may exclude information for the PCC if it has an SPS transmission and may include information for the PCC if it has a dynamically scheduled transmission. An SPS transmission on the PCC may be associated with a fixed bitwidth (e.g., 1 bit) and a fixed location on the PUCCH or PUSCH if there is no dynamic scheduling transmission on the PCC. Otherwise, the DAI may include information for the PCC if it has a dynamically scheduled transmission. Dynamically scheduled transmission may supersede SPS transmission when they conflict. In each case, UE 120x may perform PUCCH power control, determine the number of PUSCH resource elements, etc., as described above based on the availability of the DAI (or lack thereof).

In the third scheme shown in Table 3, a DAI may be included in each downlink grant and may identify all scheduled CCs. This arrangement is shown in FIG. 7. With information from the DAI, UE 120x may obtain knowledge of the scheduled CCs as long as at least one downlink grant is received in a particular subframe. UE 120x may determine the ACK/NACK bitwidth based on the number of ACK/NACK bits for each scheduled CC, e.g., as shown in equation (7).

It may be desirable for UE 120x to send DTX to indicate a downlink grant/PDCCH that is not detected by UE 120x. For example, UE 120x may determine that CCx is scheduled based on the DAI included with a downlink grant received on CCy. However, UE 120x may not detect a downlink grant for a PDSCH transmission on CCx. In that case, depending upon its configuration, UE 120x signals DTX for CCx, and eNB 110x may use the DTX feedback to improve transmission of the PDCCH for CCx.

Unused bits may be used to convey DTX as follows. A given downlink CC, CCj, may be configured with a transmission mode supporting two transport blocks (e.g., a MIMO mode) and may be associated with two ACK/NACK bits. However, in a particular subframe, CCj may be scheduled with a transmission of one transport block (e.g., a SIMO mode). Only one ACK/NACK bit may needed to acknowledge the transmission on CCj. The unused bit allocated based on the transmission mode may be used to convey whether or not there is a missing downlink grant/PDCCH based upon information from the DAI. Unused bits may also be referred to as leftover bits, orphan bits, etc. Unused bits for multiple downlink CCs may be used jointly to convey more information to eNB 110x, e.g., to convey which particular downlink grant/PDCCH is not detected by UE 120x.

In one example of reusing ACK/NACK bits, UE 120x may be configured with three downlink CCs, which may include CC1, CC2 and CC3. All three configured CCs may be associated with transmission modes supporting two transport blocks, for which two ACK/NACK bits are potentially needed for acknowledging a corresponding PDSCH transmission. eNB 110x may schedule two of the configured CCs in a given subframe, with CC1 being scheduled with DCI format 1A for one transport block, and CC3 being scheduled with DCI format 2 for two transport blocks. Four ACK/NACK bits may be available for the two scheduled CCs based on their transmission modes. However, for the data transmission described above, only three ACK/NACK bits may be generated, or one ACK/NACK bit for CC1 and two ACK/NACK bits for CC3. In that case, one unused bit would be available to UE 120x for conveying DTX for one CC. The unused bit may, for example, be used to convey DTX for CC3 and may be set to a first value (e.g., '0') if a downlink grant/PUCCH for CC3 is received, or to a second value (e.g., '1') if the downlink grant/PUCCH for CC3 is not received based on information about scheduled CCs obtained from the DAI. The four ACK/NACK bits may then be sent as follows:

Send {x100} to inform eNB 110x that the downlink grant for CC3 is missing, or Send {x0yz} to inform eNB 110x that the downlink grant for CC3 is detected, where x is an ACK/NACK bit for CC1, y and z are two ACK/NACK bits for CC3, and x, y and z may each have a value of '0' or '1'.

In general, 12 bits may be used to convey ACK, NACK, or DTX for five downlink CCs. UE 120x may be configured to report DTX whenever unused bits are available, or to report DTX upon the occurrence or certain conditions. For example, UE 120x may report DTX only if the number of configured or scheduled CCs is less than four (in order to fit into a 10-bit ACK/NACK payload), or only if two downlink CCs are configured, etc.

A DAI may also be used to convey information about scheduled subframes in TDD. For example, 2-bit DAI may be included in a downlink grant sent based on DCI format 1, 1A, 1B, 1D, 2, 2A or 2B in LTE. The 2-bit DAI may be sent in subframe n and may indicate the accumulative number of PDCCH(s) with assigned PDSCH transmission(s) and PDCCH indicating SPS release, up to the present subframe within subframe(s) n–k, with k belonging to K, where K denotes a set of downlink subframes associated with the same uplink subframe in which ACK/NACK feedback is sent. The 2-bit DAI may also be included in an uplink grant sent based on DCI format 0 in LTE. In this case, the DAI may be detected by UE 120x in subframe n–k' and may represent the total number of subframes with PDSCH transmissions and with PDCCH indicating downlink SPS release within subframes n–k', with k' belonging to K. In each case, the DAI may help UE 120x to detect the missing downlink grants, facilitate more efficient ACK/NACK feedback, and provide other advantages.

In one design, a two-dimensional (2-D) DAI may be used to convey information about scheduled CCs and scheduled subframes for multi-carrier operation in TDD. The 2-D DAI may include two components, DAI_Time and DAI_Freq, to cover time domain and frequency domain, respectively. DAI_Time may be included in a grant when operating in TDD. DAI_Freq may be included in a grant if UE 120x is configured with two or more downlink CCs in either FDD or TDD. DAI_Time may comprise two bits and may be provided for each downlink CC. DAI_Time may be included in a downlink grant or an uplink grant and may indicate the accumulative number of PDSCH transmissions (in time) over downlink subframes in a downlink subframe association set on a particular downlink CC. DAI_Freq may comprise one to three bits and may be provided for each downlink subframe. DAI_Freq may be included in a downlink grant or an uplink grant and may indicate the total number of scheduled CCs and/or which CCs are scheduled in a given subframe. DAI_Time and/or DAI_Freq may also convey different information dependent on whether they are included in a downlink grant or an uplink grant. For example, DAI_Freq included in a downlink grant may identify the scheduled CCs whereas DAI_Freq included in an uplink grant may indicate the number of scheduled CCs.

In some situations, it is desirable to reduce the number of ACK/NACK bits for transmission on the uplink. The number of bits of ACK/NACK information may be reduced by performing spatial bundling, subframe bundling, and/or CC bundling, as described in Table 8.

TABLE 8

| Bundling | |
|---|---|
| Bundling Type | Description |
| Spatial Bundling | Bundle ACKs and/or NACKs for transport blocks received via multiple layers on one downlink CC in one subframe. |
| Subframe Bundling | Bundle ACKs and/or NACKs for transport blocks received on one downlink CC in multiple subframes. |
| CC Bundling | Bundle ACKs and/or NACKs for transport blocks received on multiple downlink CCs in one subframe. |

In general, a UE may utilize one or more types of bundling to reduce the amount of ACK/NACK feedback. Bundling may be performed in different manners depending on various factors such as whether a wireless network utilizes FDD or TDD, the number of configured CCs, the uplink-downlink configuration in TDD, the desired ACK/NACK payload size, channel conditions, etc.

For spatial bundling, multiple transport blocks may be received via multiple layers on one downlink CC in one subframe, and an ACK or a NACK may be obtained for each transport block. A bundled ACK may be generated if ACKs are obtained for all transport blocks. A bundled NACK may be generated if a NACK is obtained for any transport block. For subframe bundling, multiple transport blocks may be received on one downlink CC in multiple subframes, e.g., one transport block in each subframe. An ACK or a NACK may be obtained for each transport block. A bundled ACK may be generated if ACKs are obtained for all transport blocks, and a bundled NACK may be generated if a NACK is obtained for any transport block. For CC bundling, multiple transport blocks may be received on multiple downlink CCs in one subframe, e.g., one transport block one each downlink CC. An ACK or a NACK may be obtained for each transport block. A bundled ACK may be generated if ACKs are obtained for all transport blocks, and a bundled NACK may be generated if a NACK is obtained for any transport block. With all three types of bundling, when eNB 110x receives a bundled NACK, it may retransmit all of the applicable transport blocks.

In some examples, spatial bundling is utilized with multi-carrier operation in FDD. Up to M ACK/NACK bits may be generated for M configured CCs, e.g., one ACK/NACK bit for each configured CC or scheduled CC. To improve coverage of ACK/NACK transmission, the number of configured CCs may be limited and/or ACK/NACK information may be sent with repetition, e.g., by a factor of 2, 4, or 6. ACK/NACK repetition may be utilized when there is little impact to UCI transmission. For example, since a CSI transmission may be dropped when an ACK/NACK transmission is sent, ACK/NACK repetition may be utilized when CSI transmission is not impacted.

In some examples, spatial bundling and subframe bundling may utilized for multi-carrier operation in TDD. UE 120x may be configured with (i) up to five downlink CCs for multi-carrier operation and (ii) an uplink-downlink configuration with up to four downlink subframes to one uplink subframe for TDD. One or more ACK/NACK feedback modes may be supported, and each ACK/NACK feedback mode may perform bundling in a different manner.

In a first ACK/NACK feedback mode for multi-carrier operation in TDD, only one type of bundling may be performed, with the bundling type being dependent on the number of configured CCs. If one CC is configured, then only spatial bundling may be performed to obtain up to four ACK/NACK bits, one ACK/NACK bit for each downlink subframe. If two CCs are configured, then only subframe bundling may be performed to obtain up to four ACK/NACK bits, or up to two ACK/NACK bits for each configured CC or scheduled CC. Alternatively, only spatial bundling may be performed to obtain up to eight ACK/NACK bits, or one ACK/NACK bit for each configured CC in each downlink subframe. If three or more CCs are configured, then only subframe bundling may be performed to obtain up to 2*M ACK/NACK bits, or up to two ACK/NACK bits for each configured CC or scheduled CC.

In a second ACK/NACK feedback mode for multi-carrier operation in TDD, one or more types of bundling may be performed, with the bundling type(s) being dependent on the number of configured CCs. If one CC is configured, then only subframe bundling may be performed to obtain up to two ACK/NACK bits. If two CCs are configured, then both spatial bundling and subframe bundling may be performed to obtain up to two ACK/NACK bits. If three or more CCs are configured, then both spatial bundling and subframe bundling may be performed to obtain up to M ACK/NACK bits, e.g., one ACK/NACK bit for each configured CC or scheduled CC.

Bundling may also be performed in other manners. For example, CC bundling may be performed for a subset of the M configured CCs (e.g., downlink CCs with sufficient correlation) instead of all M configured CCs. Subframe bundling may be performed for a subset of all downlink subframes in a radio frame.

The techniques described herein provide various advantages. First, the techniques may facilitate efficient ACK/NACK feedback for multi-carrier operation in FDD and TDD. The techniques may also provide multiplexing capability among different types of UCI, e.g., multiplexing of ACK/NACK and CSI in one subframe. A DAI may cover time domain (for TDD) and/or frequency domain (for FDD). A DAI may also be defined to be causal, so that a DAI sent in subframe n does not cover scheduling in subframes n+1 and later. This may allow independent scheduling to be maintained across downlink subframes in a bundling window.

FIG. 8 shows an exemplary process 800 for sending ACK/NACK information in a wireless network. Process 800 may be performed by a UE (as described herein) or by some other entity. The UE may receive a data transmission on at least one CC in a plurality of CCs configured for the UE (block 812). The UE may determine ACKINACK information for the data transmission (block 814). The UE may determine an uplink channel for sending the ACK/NACK information (block 816). When the UE sends ACK/NACK information on a PUCCH, it may perform power control for sending the ACK/NACK information based on the at least one CC on which the data transmission is received (i.e., at least one detected CC) (block 818). Alternatively, when the UE sends ACK/NACK information on PUSCH, it may determine a number of resource elements for sending the ACK/NACK information based on the plurality of CCs configured for the UE (block 820). The UE may thus considered different CCs (e.g., detected CCs or configured CCs) for different purposes and/or to send the ACK/NACK information on different uplink channels.

In one example of block 818, the UE may determine the total number of transport blocks received in the data transmission, e.g., as shown in equation (8). The UE may determine that (i) one transport block is received on each CC associated with a downlink grant having a DCI format supporting one transport block, and (ii) two transport blocks are received on each CC associated with a downlink grant having a DCI format supporting two transport blocks. The UE may determine the total number of transport blocks received in the data transmission based on whether one or two transport blocks are received on each detected CC. The UE may determine a transmit power for sending the ACK/NACK information based on the total number of transport blocks received by the UE.

In one example of block 820, the UE may determine the total number of ACK/NACK bits for the plurality of CCs. The UE may determine (i) one ACK/NACK bit for each CC configured with a transmission mode supporting one transport block and (ii) two ACK/NACK bits for each CC configured with a transmission mode supporting two transport blocks. The UE may determine the total number of ACK/NACK bits for the plurality of CCs based on one or two ACK/NACK bits for each of the plurality of CCs. The UE may determine the number of resource elements for sending the ACK/NACK information based on the total number of ACK/NACK bits for the plurality of CCs.

FIG. 9 shows an exemplary process 900 for receiving ACK/NACK information in a wireless network. Process 900 may be performed by a base station/eNB (as described herein) or by some other entity. The base station may send to a UE a data transmission on at least one CC in a plurality of CCs configured for the UE (block 912). The base station may determine an uplink channel for receiving ACK/NACK information for the data transmission from the UE (block 914). For example, the base station may determine that the ACK/NACK information will be received on PUSCH when an uplink grant accompanies the data transmission or on PUCCH when an uplink grant is not provided.

The base station may receive the ACK/NACK information from the UE on a PUCCH at a transmit power determined based on the at least one CC when it is determined to receive the ACK/NACK information on the PUCCH (block 916). In one design, the transmit power may be determined based on the total number of transport blocks received by the UE on the at least one CC. The base station may respond to the detected transmit power by sending power control commands or adjusting data transmission to the UE. When ACK/NACK information is received on the PUSCH, the number of resource elements utilized may be determined according to the CCs that are configured for use by the UE. In one example, the number of resource elements may be determined based on the total number of ACK/NACK bits for the plurality of CCs.

Figures 10, 11:
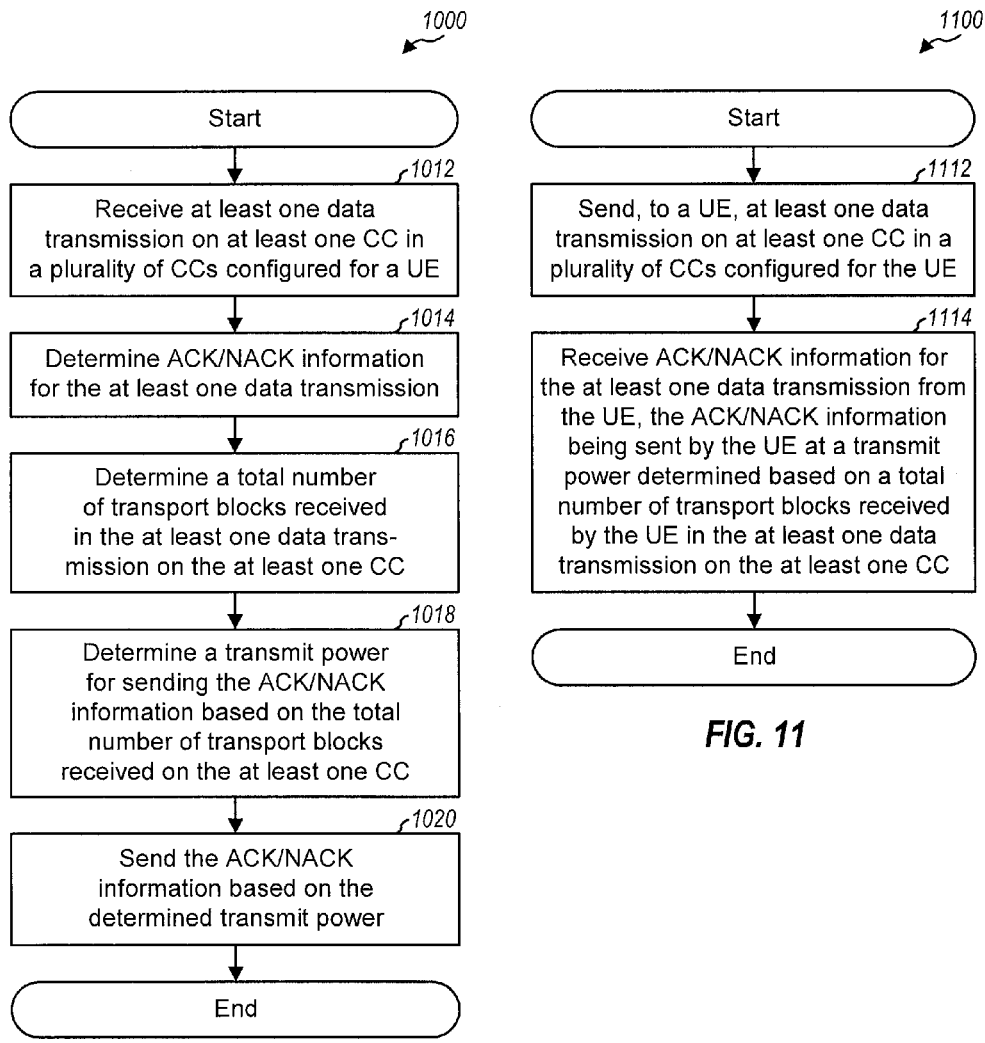
FIG. 10 shows a process for sending ACK/NACK information on a PUCCH.
FIG. 11 shows a process for receiving ACK/NACK information on a PUCCH.

FIG. 10 shows an exemplary process 1000 for sending ACK/NACK information in a wireless network. Process 1000 may be performed by a UE (as described herein) or by some other entity. The UE may receive a data transmission on at least one CC in a plurality of CCs configured for the UE (block 1012). The UE may determine ACK/NACK information for the data transmission (block 1014). The UE may determine the total number of transport blocks received in the data transmission on the at least one CC (block 1016).

The UE may determine a transmit power for sending the ACK/NACK information based on the total number of transport blocks received by the UE (block 1018). The UE may send the ACK/NACK information (e.g., on a PUCCH) based on the determined transmit power (block 1020).

The UE may receive at least one downlink grant intended for the UE. The UE may identify the at least one CC on which the data transmission is received based on the at least one downlink grant.

In one example of block 1016, the UE may determine the number of transport blocks received on each of the at least one CC. The UE may determine the total number of transport blocks received in the data transmission based on the number of transport blocks received on each CC. The UE may sum the number of transport blocks received on the at least one CC in a single subframe. In another example of block 1016, the UE may determine the number of ACK/NACK bits for each of the at least one CC. The UE may determine the total number of ACK/NACK bits for the data transmission based on the number of ACK/NACK bits for each CC. The total number of ACK/NACK bits may be equal to the total number of transport blocks.

As described herein, the UE may determine a PUCCH format for sending the ACK/NACK information based on the total number of transport blocks received in the data transmission. The UE may send the ACK/NACK information based on a PUCCH format supporting two signaling bits and channel selection. Alternatively, the UE may send the ACK/NACK information based on a PUCCH format utilizing DFT-S-OFDM.

Also, the UE may multiplex CSI with the ACK/NACK information in a subframe in which the ACK/NACK information is sent. The UE may determine available bits for sending CSI based on the total number of ACK/NACK bits and an available payload size. The UE may multiplex the CSI with the ACK/NACK information based on the available bits for sending the CSI. In another design, the UE may drop/discard CSI in the subframe in which the ACK/NACK information is sent.

FIG. 11 shows an exemplary process 1100 for receiving ACK/NACK information in a wireless network. Process 1100 may be performed by a base station/eNB (as described below) or by some other entity. The base station may send to a UE a data transmission on at least one CC in a plurality of CCs configured for the UE (block 1112). The base station may also send at least one downlink grant for the data transmission on the at least one CC. The base station may receive ACK/NACK information for the data transmission from the UE (block 1114). The ACK/NACK information may be sent by the UE at a transmit power determined based on a total number of transport blocks received by the UE in the data transmission on the at least one CC. The total number of transport blocks may be determined by the UE based on a number of transport blocks received by the UE on each of the at least one CC.

Figures 12, 13:
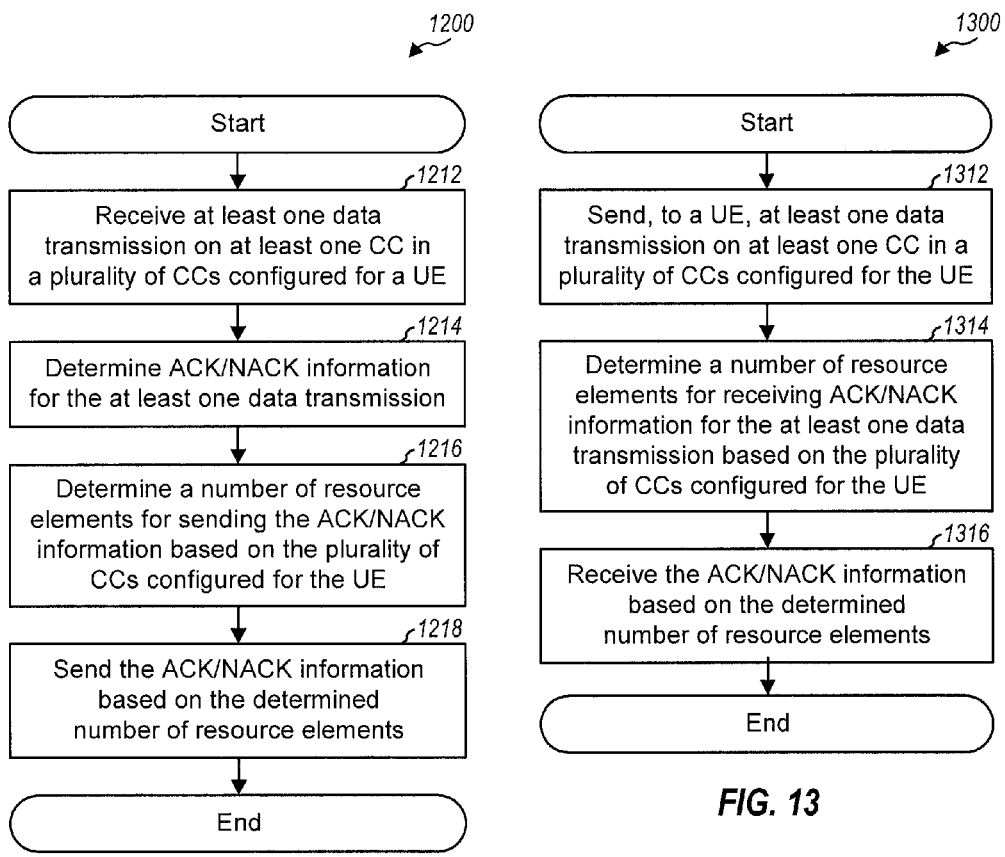
FIG. 12 shows a process for sending ACK/NACK information on a PUSCH.
FIG. 13 shows a process for receiving ACK/NACK information on a PUSCH.

FIG. 12 shows an exemplary process 1200 for sending ACK/NACK information in a wireless network. Process 1200 may be performed by a UE (as described herein) or by some other entity. The UE may receive a data transmission on at least one CC in a plurality of CCs configured for the UE (block 1212). The UE may determine ACK/NACK information for the data transmission (block 1214). The UE may determine a number of resource elements for sending the ACK/NACK information based on the plurality of CCs configured for the UE (block 1216). The UE may send the ACK/NACK information (e.g., on a PUSCH) based on the determined number of resource elements (block 1218).

In one example of block 1216, the UE may determine the total number of ACK/NACK bits for the plurality of CCs. The UE may determine the number of resource elements for sending the ACK/NACK information based on the total number of ACK/NACK bits for the plurality of CCs.

The UE may order the ACK/NACK bits for the plurality of CCs based on an index of each CC in the plurality of CCs, e.g., as illustrated by the ordered case in FIG. 6. Alternatively, the UE may place the ACK/NACK bit(s) for each CC at a specific position assigned to that CC, e.g., as illustrated by the non-ordered case in FIG. 6.

As described herein, the UE may multiplex CSI with the ACK/NACK information in a subframe in which the ACK/NACK information is sent. The UE may determine available bits for sending the CSI based on the total number of ACK/NACK bits for the plurality of CCs and an available payload size. The UE may multiplex the CSI with the ACK/NACK information based on the available bits for sending the CSI. In another design, the UE may drop/discard the CSI in the subframe in which the ACK/NACK information is sent.

FIG. 13 shows an exemplary process 1300 for receiving ACK/NACK information in a wireless network. Process 1300 may be performed by a base station/eNB (as described herein) or by some other entity. The base station may send to a UE a data transmission on at least one CC in a plurality of CCs configured for the UE (block 1312). The base station may determine a number of resource elements for receiving ACK/NACK information for the data transmission based on the plurality of CCs configured for the UE (block 1314). The number of resource elements may be determined based on the total number of ACK/NACK bits for the plurality of CCs, and the number of ACK/NACK bits for each CC may be determined based on a transmission mode of the CC. The base station may receive the ACK/NACK information based on the determined number of resource elements (block 1316). The ACK/NACK bits for the plurality of CCs may be ordered based on an index of each CC in the plurality of CCs or may be placed at a specific position for each CC.

The base station may determine available bits for sending CSI based on the total number of ACK/NACK bits for the plurality of CCs and an available payload size. The base station may demultiplex the CSI and the ACK/NACK information based on the available bits for sending the CSI.

Figure 14:
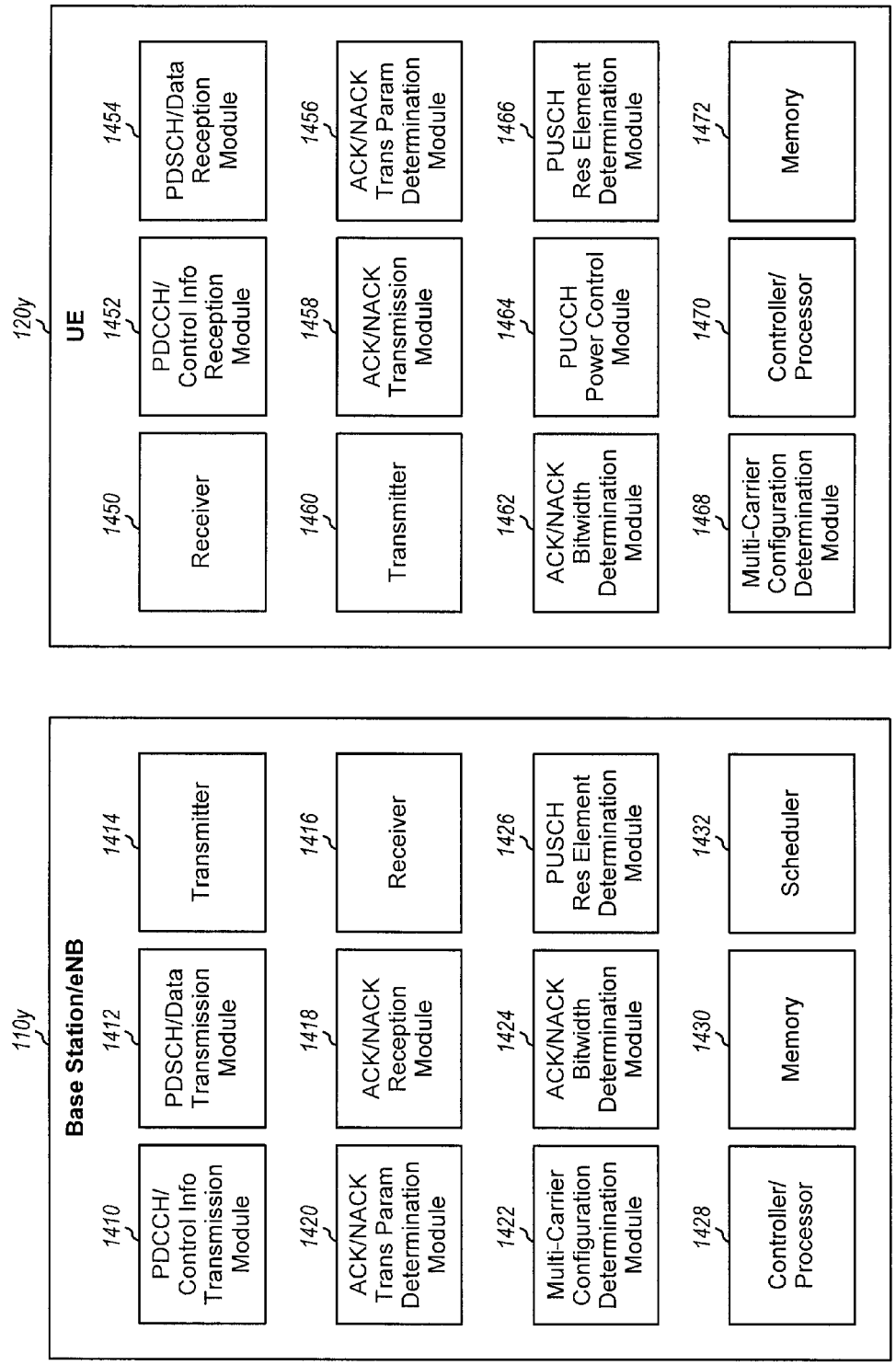
FIG. 14 shows an exemplary base station and an exemplary UE such as can perform the exemplary processes described herein.

FIG. 14 shows a block diagram of a design of a base station/eNB 110y and a UE 120y, which may be one of the base stations/eNBs and one of the UEs in FIG. 1. Within base station 110y, a module 1410 may generate PDCCH transmissions comprising downlink grants and/or other DCI for one or more CCs on which UE 120y is scheduled. A module 1412 may generate PDSCH transmissions comprising data for the scheduled CCs. A transmitter 1414 may generate and transmit one or more downlink signals comprising the PDCCH and/or PDSCH transmissions. A receiver 1416 may receive and process uplink signals transmitted by UE 120y and other UEs. A module 1420 may determine transmission parameters (e.g., an ACK/NACK feedback scheme, a code rate, etc.) for ACK/NACK information sent by UE 120y for a data transmission sent by eNB 110y. A module 1418 may process one or more received signals in accordance with the ACK/NACK transmission parameters to recover the ACK/NACK information sent by UE 120y. Module 1418 may also recover CSI and/or other information sent by UE 120y.

A module 1422 may determine a multi-carrier configuration of UE 120y, e.g., determine which CCs are configured for UE 120y for the downlink and uplink, and which CCs are downlink PCC and uplink PCC for UE 120y. A module 1424 may determine the ACK/NACK bitwidth and/or the total transport block count for UE 120y based on various factors such as whether or not DAI is included in grants sent to UE 120y, the configured CCs or scheduled CCs for UE 120y, whether bundling is performed, etc. A module 1426 may determine the number of resource elements used by UE 120y to send ACK/NACK information on the PUSCH. The various modules within base station 110y may operate as described above. A controller/processor 1428 may direct the operation of various modules within base station 110y. A memory 1430 may store data and program codes for base station 110y. A scheduler 1432 may schedule UEs for data transmission.

Within UE 120y, a receiver 1450 may receive and process downlink signals from base station 110y and other base stations. A module 1452 may process (e.g., demodulate and decode) one or more received signals to recover PDCCH transmissions sent to UE 120y. A module 1454 may process the received signal(s) to recover PDSCH transmissions sent to UE 120y. A module 1458 may determine ACK/NACK information for the received data transmission. A module 1456 may determine transmission parameters for sending the ACK/NACK information. Module 1458 may send the ACK/NACK information on the PUCCH or PUSCH in accordance with the ACK/NACK transmission parameters. Module 1458 may also send CSI and/or other information on the PUCCH or PUSCH. A transmitter 1460 may generate and transmit one or more uplink signals comprising a PUCCH transmission or a PUSCH transmission.

A module 1468 may determine a multi-carrier configuration of UE 120y, e.g., determine which CCs are configured for UE 120y for the downlink and uplink, and which CCs are downlink PCC and uplink PCC for UE 120y. A module 1462 may determine the ACK/NACK bitwidth and/or the total transport block count for UE 120y based on various factors such as whether or not DAI is included in grants sent to UE 120y, the configured CCs or scheduled CCs for UE 120y, whether bundling is performed, etc. A module 1464 may perform power control for the PUCCH based on the ACK/NACK bitwidth and/or the total transport block count, e.g., determine the transmit power for sending the ACK/NACK information on the PUCCH. A module 1466 may determine the number of resource elements for sending the ACK/NACK information on the PUSCH. The various modules within UE 120y may operate as described above. A controller/processor 1470 may direct the operation of various modules within UE 120y. A memory 1472 may store data and program codes for UE 120y.

The modules in FIG. 14 may comprise processors, electronic devices, hardware devices, electronic components, logical circuits, memories, software codes, firmware codes, etc., or any combination thereof.

Figure 15:
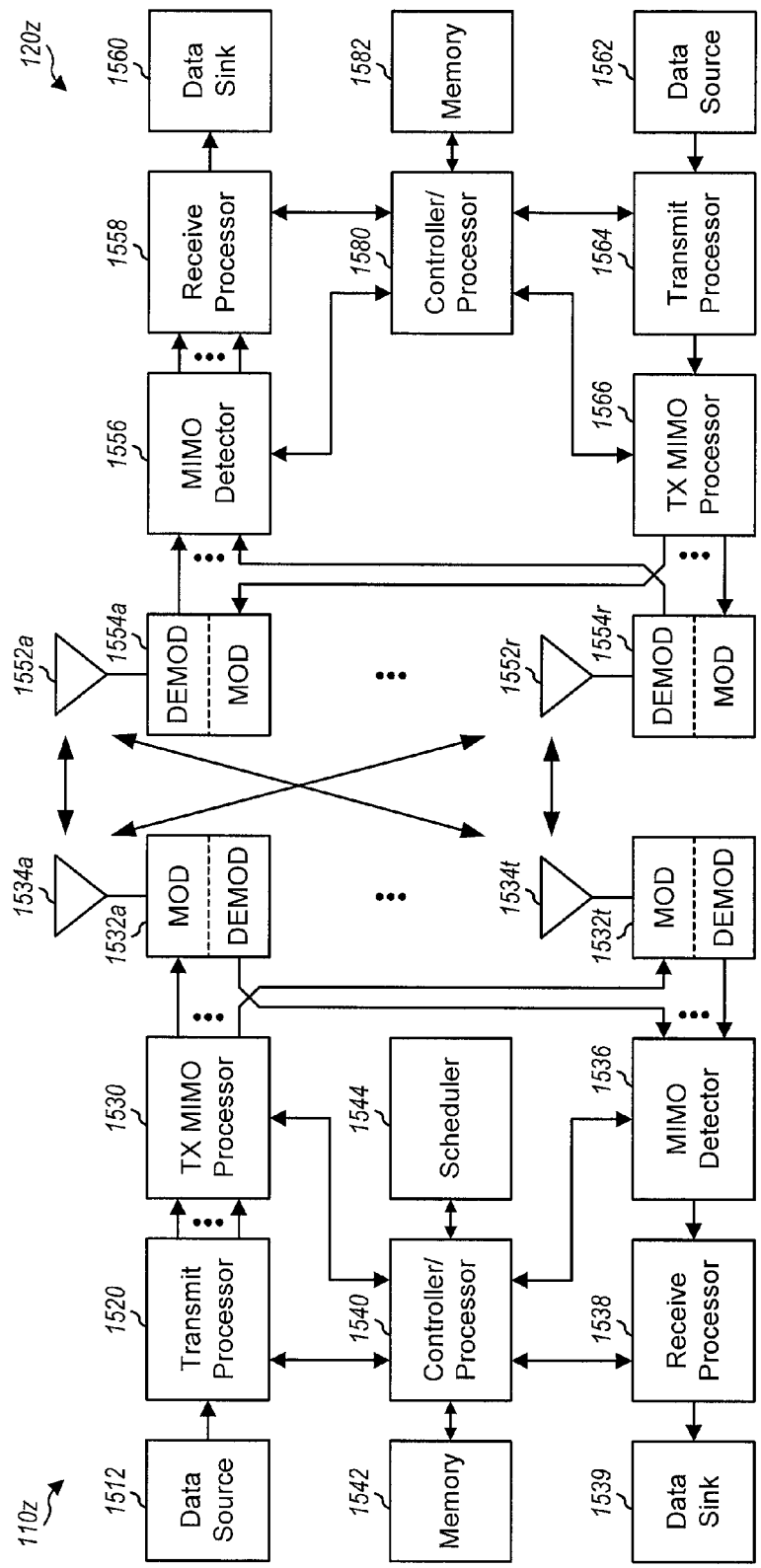
FIG. 15 shows additional aspects of a base station and a UE according to the present disclosure.

FIG. 15 shows a block diagram of a design of a base station/eNB 110z and a UE 120z, which may be one of the base stations/eNBs and one of the UEs in FIG. 1. Base station 110z may be equipped with T antennas 1534a through 1534t, and UE 120z may be equipped with R antennas 1552a through 1552r, where in general T≥1 and R≥1.

At base station 110z, a transmit processor 1520 may receive data from a data source 1512 for transmission on one or more downlink CCs to one or more UEs, process (e.g., encode and modulate) the data for each UE based on one or more modulation and coding schemes selected for that UE, and provide data symbols for all UEs. Transmit processor 1520 may also process control information (e.g., for grants, DAI, configuration messages, etc.) and provide control symbols. Processor 1520 may also generate reference symbols for reference signals. A transmit (TX) MIMO processor 1530 may precode the data symbols, the control symbols, and/or the reference symbols (if applicable) and may provide T output symbol streams to T modulators (MOD) 1532a through 1532t. Each modulator 1532 may process its output symbol stream (e.g., for OFDM, etc.) to obtain an output sample stream. Each modulator 1532 may further condition (e.g., convert to analog, amplify, filter, and upconvert) its output sample stream to obtain a downlink signal. T downlink signals from modulators 1532a through 1532t may be transmitted via T antennas 1534a through 1534t, respectively.

At UE 120z, antennas 1552a through 1552r may receive the downlink signals from base station 110z and/or other base stations and may provide received signals to demodulators (DEMODs) 1554a through 1554r, respectively. Each demodulator 1554 may condition (e.g., filter, amplify, downconvert, and digitize) its received signal to obtain input samples. Each demodulator 1554 may further process the input samples (e.g., for OFDM, etc.) to obtain received symbols. A MIMO detector 1556 may obtain received symbols from all R demodulators 1554a through 1554r, perform MIMO detection on the received symbols, and provide detected symbols. A receive processor 1558 may process (e.g., demodulate and decode) the detected symbols, provide decoded data for UE 120z to a data sink 1560, and provide decoded control information to a controller/processor 1580.

On the uplink, at UE 120z, a transmit processor 1564 may receive and process data from a data source 1562 and control information (e.g., ACKNACK information, CSI, etc.) from controller/processor 1580. Processor 1564 may also generate reference symbols for one or more reference signals. The symbols from transmit processor 1564 may be precoded by a TX MIMO processor 1566 if applicable, further processed by modulators 1554a through 1554r (e.g., for SC-FDM, OFDM, etc.), and transmitted to base station 110z. At base station 110z, the uplink signals from UE 120z and other UEs may be received by antennas 1534, processed by demodulators 1532, detected by a MIMO detector 1536 if applicable, and further processed by a receive processor 1538 to obtain decoded data and control information sent by UE 120z and other UEs. Processor 1538 may provide the decoded data to a data sink 1539 and the decoded control information to controller/processor 1540.

Controllers/processors 1540 and 1580 may direct the operation at base station 110z and UE 120z, respectively. Processor 1540 and/or other processors and modules at base station 110z may perform or direct process 900 in FIG. 9, process 1100 in FIG. 11, process 1300 in FIG. 13, and/or other processes for the techniques described herein. Processor 1580 and/or other processors and modules at UE 120z may perform or direct process 800 in FIG. 8, process 1000 in FIG. 10, process 1200 in FIG. 12, and/or other processes for the techniques described herein. Memories 1542 and 1582 may store data and program codes for base station 110z and UE 120z, respectively. A scheduler 1544 may schedule UEs for data transmission on the downlink and/or uplink.

It will be recognized that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Also, it will be appreciated that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   receiving a data transmission on at least one component carrier (CC) in a plurality of CCs configured for a user equipment (UE);
   determining acknowledgement/negative acknowledgement (ACK/NACK) information for the data transmission;
   determining a total number of ACK/NACK bits for the plurality of CCs;
   determining a number of resource elements for sending the ACK/NACK information based on the total number of ACK/NACK bits; and
   sending the ACK/NACK information based on the determined number of resource elements.

2. The method of claim 1, wherein the determining the total number of ACK/NACK bits comprises:
   determining one ACK/NACK bit for each CC configured with a transmission mode supporting one transport block,
   determining two ACK/NACK bits for each CC configured with a transmission mode supporting two transport blocks, and
   determining the total number of ACK/NACK bits for the plurality of CCs based on one or two ACK/NACK bits for each of the plurality of CCs.

3. The method of claim 1, further comprising:
   ordering ACK/NACK bits for the plurality of CCs based on an index of each CC in the plurality of CCs.

4. A method for wireless communication, comprising:
   receiving a data transmission on at least one component carrier (CC) in a plurality of CCs configured for a user equipment (UE);
   determining acknowledgement/negative acknowledgement (ACK/NACK) information for the data transmission;
   determining a number of resource elements for sending the ACK/NACK information based on the plurality of CCs configured for the UE; and
   sending the ACK/NACK information on a physical uplink shared channel (PUSCH) based on the determined number of resource elements.

5. The method of claim 4, further comprising:
   multiplexing channel state information (CSI) with the ACK/NACK information on the PUSCH.

6. An apparatus for wireless communication, comprising:
means for receiving a data transmission on at least one component carrier (CC) in a plurality of CCs configured for a user equipment (UE);
means for determining acknowledgement/negative acknowledgement (ACK/NACK) information for the data transmission;
means for determining a total number of ACK/NACK bits for the plurality of CCs;
means for determining a number of resource elements for sending the ACK/NACK information based on the total number of ACK/NACK bits for the plurality of CCs; and
means for sending the ACK/NACK information based on the determined number of resource elements.

7. The apparatus of claim 6, wherein the means for determining the total number of ACK/NACK bits comprises:
means for determining one ACK/NACK bit for each CC configured with a transmission mode supporting one transport block,
means for determining two ACK/NACK bits for each CC configured with a transmission mode supporting two transport blocks, and
means for determining the total number of ACK/NACK bits for the plurality of CCs based on one or two ACK/NACK bits for each of the plurality of CCs.

8. The apparatus of claim 6, further comprising:
means for ordering ACK/NACK bits for the plurality of CCs based on an index of each CC in the plurality of CCs.

9. An apparatus for wireless communication, comprising:
means for receiving a data transmission on at least one component carrier (CC) in a plurality of CCs configured for a user equipment (UE);
means for determining acknowledgement/negative acknowledgement (ACK/NACK) information for the data transmission;
means for determining a number of resource elements for sending the ACK/NACK information based on the plurality of CCs configured for the UE; and
means for sending the ACK/NACK information on a physical uplink shared channel (PUSCH) based on the determined number of resource elements.

10. The apparatus of claim 9, further comprising:
means for multiplexing channel state information (CSI) with the ACK/NACK information on the PUSCH.

11. An apparatus for wireless communication, comprising:
at least one processor configured to:
receive a data transmission on at least one component carrier (CC) in a plurality of CCs configured for a user equipment (UE),
determine acknowledgement/negative acknowledgement (ACK/NACK) information for the data transmission,
determine a total number of ACK/NACK bits for the plurality of CCs;
determine a number of resource elements for sending the ACK/NACK information based on the total number of ACK/NACK bits for the plurality of CCs; and
send the ACK/NACK information based on the determined number of resource elements; and
a memory coupled to the at least one processor.

12. The apparatus of claim 11, wherein the at least one processor is configured to determine the total number of ACK/NACK bits at least in part by:
determining one ACK/NACK bit for each CC configured with a transmission mode supporting one transport block,
determining two ACK/NACK bits for each CC configured with a transmission mode supporting two transport blocks, and
determining the total number of ACK/NACK bits for the plurality of CCs based on one or two ACK/NACK bits for each of the plurality of CCs.

13. The apparatus of claim 12 wherein the at least one processor is further configured to:
order ACK/NACK bits for the plurality of CCs based on an index of each CC in the plurality of CCs.

14. An apparatus for wireless communication, comprising:
at least one processor configured to:
receive a data transmission on at least one component carrier (CC) in a plurality of CCs configured for a user equipment (UE),
determine acknowledgement/negative acknowledgement (ACK/NACK) information for the data transmission,
determine a number of resource elements for sending the ACK/NACK information based on the plurality of CCs configured for the UE, and
send the ACK/NACK information on a physical uplink shared channel (PUSCH) based on the determined number of resource elements; and
a memory coupled to the at least one processor.

15. The apparatus of claim 14, further comprising:
multiplexing channel state information (CSI) with the ACK/NACK information on the PUSCH.

16. A non-transitory computer-readable medium having program code recorded thereon, the program code comprising:
code for causing at least one processor to receive a data transmission on at least one component carrier (CC) in a plurality of CCs configured for a user equipment (UE),
code for causing the at least one processor to determine acknowledgement/negative acknowledgement (ACK/NACK) information for the data transmission,
code for causing the at least one processor to determine a total number of ACK/NACK bits for the plurality of CCs,
code for causing the at least one processor to determine a number of resource elements for sending the ACK/NACK information based on the total number of ACK/NACK bits for the plurality of CCs, and
code for causing the at least one processor to send the ACK/NACK information based on the determined number of resource elements.

17. The non-transitory computer-readable medium of claim 16, wherein the code for causing the at least one processor to determine the total number of ACK/NACK bits comprises:
code for causing the at least one processor to determine one ACK/NACK bit for each CC configured with a transmission mode supporting one transport block,
code for causing the at least one processor to determine two ACK/NACK bits for each CC configured with a transmission mode supporting two transport blocks, and
code for causing the at least one processor to determine the total number of ACK/NACK bits for the plurality of CCs based on one or two ACK/NACK bits for each of the plurality of CCs.

18. The non-transitory computer-readable medium of claim 16, further comprising:
    code for causing the at least one processor to order ACK/NACK bits for the plurality of CCs based on an index of each CC in the plurality of CCs.

19. A non-transitory computer-readable medium having program code recorded thereon, the program code comprising:
    code for causing at least one processor to receive a data transmission on at least one component carrier (CC) in a plurality of CCs configured for a user equipment (UE),
    code for causing the at least one processor to determine acknowledgement/negative acknowledgement (ACK/NACK) information for the data transmission,
    code for causing the at least one processor to determine a number of resource elements for sending the ACK/NACK information based on the plurality of CCs configured for the UE, and
    code for causing the at least one processor to send the ACK/NACK information on a physical uplink shared channel (PUSCH) based on the determined number of resource elements.

20. The non-transitory computer-readable medium of claim 19, further comprising:
    code for causing the at least one processor to multiplex channel state information (CSI) with the ACK/NACK information on the PUSCH.

21. A method for wireless communication, comprising:
    sending, to a user equipment (UE), a data transmission on at least one component carrier (CC) in a plurality of CCs configured for the UE;
    determining a number of resource elements for receiving acknowledgement/negative acknowledgement (ACK/NACK) information for the data transmission based on a total number of ACK/NACK bits for the plurality of CCs configured for the UE, wherein a number of ACK/NACK bits for each of the plurality of CCs is determined based on a transmission mode of the CC; and
    receiving the ACK/NACK information based on the determined number of resource elements.

22. A method for wireless communication, comprising:
    sending, to a user equipment (UE), a data transmission on at least one component carrier (CC) in a plurality of CCs configured for the UE;
    determining a number of resource elements for receiving acknowledgement/negative acknowledgement (ACK/NACK) information for the data transmission based on the plurality of CCs configured for the UE; and
    receiving the ACK/NACK information based on the determined number of resource elements,
    wherein ACK/NACK bits for the plurality of CCs are ordered based on an index of each CC in the plurality of CCs.

23. An apparatus for wireless communication, comprising:
    means for sending, to a user equipment (UE), a data transmission on at least one component carrier (CC) in a plurality of CCs configured for the UE;
    means for determining a number of resource elements for receiving acknowledgement/negative acknowledgement (ACK/NACK) information for the data transmission based on a total number of ACK/NACK bits for the plurality of CCs configured for the UE, wherein a number of ACK/NACK bits for each of the plurality of CCs is determined based on a transmission mode of the CC; and
    means for receiving the ACK/NACK information based on the determined number of resource elements.

24. An apparatus for wireless communication, comprising:
    means for sending, to a user equipment (UE), a data transmission on at least one component carrier (CC) in a plurality of CCs configured for the UE;
    means for determining a number of resource elements for receiving acknowledgement/negative acknowledgement (ACK/NACK) information for the data transmission based on the plurality of CCs configured for the UE; and
    means for receiving the ACK/NACK information based on the determined number of resource elements,
    wherein ACK/NACK bits for the plurality of CCs are ordered based on an index of each CC in the plurality of CCs.

25. An apparatus for wireless communication, comprising:
    at least one processor configured to:
        send, to a user equipment (UE), a data transmission on at least one component carrier (CC) in a plurality of CCs configured for the UE,
        determine a number of resource elements for receiving acknowledgement/negative acknowledgement (ACK/NACK) information for the data transmission based on a total number of ACK/NACK bits for the plurality of CCs configured for the UE, wherein a number of ACK/NACK bits for each of the plurality of CCs is determined based on a transmission mode of the CC, and
        receive the ACK/NACK information based on the determined number of resource elements; and
    a memory coupled to the at least one processor.

26. An apparatus for wireless communication, comprising:
    at least one processor configured to:
        send, to a user equipment (UE), a data transmission on at least one component carrier (CC) in a plurality of CCs configured for the UE,
        determine a number of resource elements for receiving acknowledgement/negative acknowledgement (ACK/NACK) information for the data transmission based on the plurality of CCs configured for the UE, and
        receive the ACK/NACK information based on the determined number of resource elements,
        wherein ACK/NACK bits for the plurality of CCs are ordered based on an index of each CC in the plurality of CCs; and
    a memory coupled to the at least one processor.

27. A non-transitory computer-readable medium comprising:
    code for causing at least one processor to send, to a user equipment (UE), a data transmission on at least one component carrier (CC) in a plurality of CCs configured for the UE,
    code for causing the at least one processor to determine a number of resource elements for receiving acknowledgement/negative acknowledgement (ACK/NACK) information for the data transmission based on a total number of ACK/NACK bits for the plurality of CCs configured for the UE, wherein a number of ACK/

NACK bits for each of the plurality of CCs is determined based on a transmission mode of the CC, and code for causing the at least one processor to receive the ACK/NACK information based on the determined number of resource elements.

28. A non-transitory computer-readable medium comprising:

code for causing at least one processor to send, to a user equipment (UE), a data transmission on at least one component carrier (CC) in a plurality of CCs configured for the UE, code for causing the at least one processor to determine a number of resource elements for receiving acknowledgement/negative acknowledgement (ACK/NACK) information for the data transmission based on the plurality of CCs configured for the UE, and code for causing the at least one processor to receive the ACK/NACK information based on the determined number of resource elements, wherein ACK/NACK bits for the plurality of CCs are ordered based on an index of each CC in the plurality of CCs.

* * * * *